US006405302B1

(12) United States Patent
Ohsuga et al.

(10) Patent No.: US 6,405,302 B1
(45) Date of Patent: Jun. 11, 2002

(54) MICROCOMPUTER

(75) Inventors: Hiroshi Ohsuga, Hino; Atsushi Kiuchi, Kokubunji; Hironobu Hasegawa, Kodaira; Toru Baji, Inagi; Koki Noguchi, Tokyo; Yasushi Akao; Shiro Baba, both of Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/291,910

(22) Filed: Apr. 14, 1999

Related U.S. Application Data

(63) Continuation of application No. 08/630,320, filed on Apr. 10, 1996, now Pat. No. 5,867,726.

(30) Foreign Application Priority Data

May 2, 1995 (JP) ............................................. 7-132906
Dec. 14, 1995 (JP) ............................................. 7-347441

(51) Int. Cl.$^7$ ......................... G06F 13/40; G06F 13/42; G06F 13/20; G06F 9/26
(52) U.S. Cl. ........................... 712/35; 712/36; 712/32; 710/36; 710/126; 710/130; 710/131; 710/129
(58) Field of Search .................... 708/490, 554, 708/409, 313, 524, 319, 709; 711/109, 165, 200, 128, 126, 129, 130, 131, 52, 204, 149, 148; 377/64; 361/87, 78, 63; 712/200, 38, 35, 36, 32, 212, 37, 42, 218; 710/107, 36, 126, 127, 128, 129, 130, 131, 60

(56) References Cited

U.S. PATENT DOCUMENTS

| 4,811,267 | A | * | 3/1989 | Ando et al. | ................. 708/490 |
| 5,293,611 | A | * | 3/1994 | Wada | .......................... 711/165 |
| 5,386,529 | A | * | 1/1995 | Kondo | ........................ 711/200 |
| 5,475,556 | A | * | 12/1995 | Yoon et al. | .................... 361/87 |

FOREIGN PATENT DOCUMENTS

| EP | 0363222 A2 | 4/1990 | ............. G06F/9/38 |
| EP | 0426393 A2 | 5/1991 | ............. G06F/9/30 |
| EP | 0465054 A1 | 1/1992 | ............. G06F/3/05 |
| EP | 0583089 A2 | 2/1994 | ............. G06F/9/38 |

OTHER PUBLICATIONS

Smith J E et al.: The Astronautics ZS–1 Processor; 1988, IEEE, pp. 307–310.

* cited by examiner

Primary Examiner—Daniel H. Pan
(74) Attorney, Agent, or Firm—Loudermilk & Associates

(57) ABSTRACT

A built-in memory is divided into the following two types: first memories 5 and 7 and second memories 4 and 6, and made accessible in parallel by third buses XAB and XDB and second buses YAB and YDB respectively. Thereby, a CPU core 2 can simultaneously transfer two data values from the built-in memory to a DSP engine 3. Moreover, the third buses XAB and XDB and the second buses YAB and YDB are also separate from first buses IAB and IDB to be externally interfaced and the CPU core 2 can access an external memory in parallel with the access to the second memories 4 and 6 and the first memories 5 and 7.

34 Claims, 21 Drawing Sheets

FIG. 2

| Address | Region |
|---|---|
| H'00000000 | EXCEPTION VECTOR TABLE AREA(256B) |
| H'00000400 | NORMAL ADDRESS SPACE(32MB) |
| H'02000000 | X-ROM ADDRESS SPACE(24KB) |
| H'02006000 | X-RAM ADDRESS SPACE(4KB) |
| H'02007000 | X-RAM_MIRROR ADDRESS SPACE(4KB) |
| H'02008000 | X-ROM, RAM_MIRROR ADDRESS SPACE(32KB) |
| H'02010000 | Y-ROM ADDRESS SPACE(24KB) |
| H'02016000 | Y-RAM ADDRESS SPACE(4KB) |
| H'02017000 | Y-RAM_MIRROR ADDRESS SPACE(4KB) |
| H'02018000 | Y-ROM, RAM_MIRROR ADDRESS SPACE(32KB) |
| H'02020000 | NORMAL ADDRESS SPACE(96MB) |
| H'08000000 | RESERVED |
| H'20000000 | NORMAL ADDRESS SPACE(128MB) |
| H'28000000 | RESERVED |
| H'FFFFFE00 | ON-CHIP PERIPHERAL REGISTER FIELD(512B) |

FIG. 5

EXAMPLE OF CPU INSTRUCTIONS

| MNEMONICS | | (MSB) INSTRUCTION CODE (LSB) |
|---|---|---|
| MAC.L | @Rs+,@Rn+ | 0000 nnnnssss1111 |
| MOV.L | Rs,@(disp,Rn) | 0001 nnnnssssdddd |
| AND | Rs,Rn | 0010 nnnnssss1001 |
| ADD | Rs,Rn | 0011 nnnnssss1100 |
| SHLL | Rn | 0100 nnnn00000000 |
| MOV.L | @(disp,Rs),Rn | 0101 nnnnssssdddd |
| MOV.L | @Rs,Rn | 0110 nnnnssss0010 |
| ADD | #imm,Rn | 0111 nnnniiiiiiii |
| MOV.B | R0,@(disp,Rn) | 1000 0000nnnndddd |
| MOV.W | @(disp,PC),Rn | 1001 nnnndddddddd |
| BRA | Label | 1010 dddddddddddd |
| BSR | Label | 1011 dddddddddddd |
| OR | #imm,R0 | 1100 1011iiiiiiii |
| MOV.L | @(disp,PC),Rn | 1101 nnnndddddddd |
| MOV | #imm,Rn | 1110 nnnniiiiiiii |

EXAMPLE OF DSP INSTRUCTIONS

| MNEMONICS | (MSB) | | INSTRUCTION CODE (LSB) |
|---|---|---|---|
| MOVX.W @R4,X0 MOVY.W @R6,Y0 | 1111 | 00 | 0001010000 |
| MOVS.W @R2, A0 | 1111 | 01 | 0001000000 |
| PADD A0, M0, A0 PMULS A1, A1, A0 MOVX.W @R4, X0 MOVY.W @R6,Y0 | 1111 | 10 | 00010101000001000000000000000000 |
| VACANCY | 1111 | 11 | ************ |

ALU OPERATION IN CPU

DATA MOVE FROM MEM. TO CPU

DATA MOVE FROM CPU TO MEM.

DSP DATA OPERATION IN CPU & DSP

DATA MOVE (MOVX,MOVY) FROM MEM. TO DSP

DATA MOVE (MOVX,MOVY) FROM DSP TO MEM.

DATA MOVE (MOVSY) FROM MEM. TO DSP

DATA MOVE (MOVSY) FROM DSP TO MEM.

DATA MOVE (MOVX, MOVY) FROM MEM. TO DSP
AND
DSP DATA OPERATION IN CPU & DSP

AN EXAMPLE OF ACCESS TO X,YAB AND IAB AT THE SAME CYCLE

FIG. 18

DSP 16BIT INSTRUCTION CODES (1)

| CLASS | MNEMONICS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| X SIDE OF DATE TRANSFER | NOPX | 1 | 1 | 1 | 1 | 0 | 0 | * | | | | * | | 0 | 0 | | |
| | MOVX.W @Ax,Dx | 1 | 1 | 1 | 1 | 0 | 0 | Ax | | Dx | | 0 | | 0 | 1 | | |
| | MOVX.W @Ax+,Dx | 1 | 1 | 1 | 1 | 0 | 0 | Ax | | Dx | | 0 | | 1 | 0 | | |
| | MOVX.W @Ax+Ix,Dx | 1 | 1 | 1 | 1 | 0 | 0 | Ax | | Dx | | 0 | | 1 | 1 | | |
| | MOVX.W Da,@Ax | 1 | 1 | 1 | 1 | 0 | 0 | Ax | | Da | | 1 | | 0 | 1 | | |
| | MOVX.W Da,@Ax+ | 1 | 1 | 1 | 1 | 0 | 0 | Ax | | Da | | 1 | | 1 | 0 | | |
| | MOVX.W Da,@Ax+Ix | 1 | 1 | 1 | 1 | 0 | 0 | Ax | | Da | | 1 | | 1 | 1 | | |
| Y SIDE OF DATE TRANSFER | NOPY | 1 | 1 | 1 | 1 | 0 | 0 | | * | * | * | | * | | | 0 | 0 |
| | MOVY.W @Ay,Dy | 1 | 1 | 1 | 1 | 0 | 0 | | Ay | | Dy | | 0 | | | 0 | 1 |
| | MOVY.W @Ay+,Dy | 1 | 1 | 1 | 1 | 0 | 0 | | Ay | | Dy | | 0 | | | 1 | 0 |
| | MOVY.W @Ay+Iy,Dy | 1 | 1 | 1 | 1 | 0 | 0 | | Ay | | Dy | | 0 | | | 1 | 1 |
| | MOVY.W Da,@Ay | 1 | 1 | 1 | 1 | 0 | 0 | | Ay | | Da | | 1 | | | 0 | 1 |
| | MOVY.W Da,@Ay+ | 1 | 1 | 1 | 1 | 0 | 0 | | Ay | | Da | | 1 | | | 1 | 0 |
| | MOVY.W Da,@Ay+Iy | 1 | 1 | 1 | 1 | 0 | 0 | | Ay | | Da | | 1 | | | 1 | 1 |

DSP 16BIT INSTRUCTION CODES (2)

| CLASS | MNEMONICS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| SINGLE DATE TRANSFER | MOVS.W @-As,Ds | 1 | 1 | 1 | 1 | 0 | 1 | As | | Ds | | | | 0 | 0 | 1 | 0 |
| | MOVS.W @As,Ds | | | | | | | 0: R4 | | 0: (#1) | | | | 0 | 1 | 0 | 0 |
| | MOVS.W @As+,Ds | | | | | | | 1: R5 | | 1: (#1) | | | | 1 | 0 | | |
| | MOVS.W @As+Ix,Ds | | | | | | | 2: R2 | | 2: (#1) | | | | 1 | 1 | | |
| | MOVS.W Ds,@-As | | | | | | | 3: R3 | | 3: (#1) | | | | 0 | 0 | | 1 |
| | MOVS.W Ds,@As | | | | | | | | | 4: (#1) | | | | 0 | 1 | | |
| | MOVS.W Da,@As+ | | | | | | | | | 5: A1 | | | | 1 | 0 | | |
| | MOVS.W Da,@As+Ix | | | | | | | | | 6: (#1) | | | | 1 | 1 | | |
| | MOVS.L @-As,Ds | | | | | | | | | 7: A0 | | | | 0 | 0 | 1 | 0 |
| | MOVS.L @As,Ds | | | | | | | | | 8: X0 | | | | 0 | 1 | | |
| | MOVS.L @As+,Ds | | | | | | | | | 9: X1 | | | | 1 | 0 | | |
| | MOVS.L @As+Ix,Ds | | | | | | | | | A: Y0 | | | | 1 | 1 | | |
| | MOVS.L Ds,@-As | | | | | | | | | B: Y1 | | | | 0 | 0 | | 1 |
| | MOVS.L Ds,@As | | | | | | | | | C: M0 | | | | 0 | 1 | | |
| | MOVS.L Ds,@As+ | | | | | | | | | D: A1G | | | | 1 | 0 | | |
| | MOVS.L Ds,@As+Ix | | | | | | | | | E: M1 | | | | 1 | 1 | | |
| | | | | | | | | | | F: A0G | | | | | | | |

FIG. 20

DSP 32BIT INSTRUCTION CODES (1)

| CLASS | MNEMONICS | 31 | 30 | 29 | 28 | 27 | 26 | 25 | 24 | 23 | 22 | 21 | 20 | 19 | 18 | 17 | 16 | 15 | ... | 0 |
|---|---|---|---|---|---|---|---|---|---|---|---|---|---|---|---|---|---|---|---|---|
| X SIDE OF DATE TRANSFER | NOPX | 1 | 1 | 1 | 1 | 1 | 0 | * | | | | * | | 0 | 0 | | | | | |
| | MOVX.W @Ax,Dx | | | | | | | Ax | | Dx | | 0 | | 0 | 1 | | | | B FIELD | |
| | MOVX.W @Ax+,Dx | | | | | | | | | | | | | 1 | 0 | | | | | |
| | MOVX.W @Ax+Ix,Dx | | | | | | | | | | | 1 | | 1 | 1 | | | | | |
| | MOVX.W Da,@Ax | | | | | | | | | Da | | | | 0 | 1 | | | | | |
| | MOVX.W Da,@Ax+ | | | | | | | | | | | | | 1 | 0 | | | | | |
| | MOVX.W Da,@Ax+Ix | | | | | | | | | | | | | 1 | 1 | | | | | |
| Y SIDE OF DATE TRANSFER | NOPY | | | | | | | * | * | * | * | | | | | 0 | 0 | | | |
| | MOVY.W @Ay,Dy | | | | | | | | Ay | | Dy | | 0 | | | 0 | 1 | | B FIELD | |
| | MOVY.W @Ay+,Dy | | | | | | | | | | | | | | | 1 | 0 | | | |
| | MOVY.W @Ay+Iy,Dy | | | | | | | | | | | | 1 | | | 1 | 1 | | | |
| | MOVY.W Da,@Ay | | | | | | | | | | Da | | | | | 0 | 1 | | | |
| | MOVY.W Da,@Ay+ | | | | | | | | | | | | | | | 1 | 0 | | | |
| | MOVY.W Da,@Ay+Iy | | | | | | | | | | | | | | | 1 | 1 | | | |

Ax:0=R4,1=R5  Ay:0=R6,1=R7  Dx:0=X0,1=X1  Dy:0=Y0,1=Y1  Da:0=A0,1=A1

A FIELD

FIG. 21

DSP 32BIT INSTRUCTION CODES (2)

| CLASS | MNEMONICS | 31 30 29 28 27 26 | 25 ... 16 | 15 14 13 12 | 11 10 | 9 8 | 7 6 | 5 4 | 3 2 1 0 |
|---|---|---|---|---|---|---|---|---|---|
| Imm. SHIFT | PSHL #Imm,Dz | 1 1 1 1 1 0 | A FIELD | 0 0 0 0 | 0 0 | -16<=Imm<=+16 | | | Dz |
| | PSHA #Imm,Dz | | | 0 0 0 0 | 1 0 | -32<=Imm<=+32 | | | Dz |
| | VACANCY | | | 0 0 0 0 | 0 1 | | | | |
| | | | | 0 0 0 1 | | | | | |
| 6 OPREAND PARALLEL OPERATION | PMULS Se,Sf,Dg | | | 0 1 0 0 | | Se | Sf | Sx Sy | Dg Du |
| | VACANCY | | | 0 1 0 1 | | 0:X0 | 0:Y0 | 0:X0 0:Y0 | 0:M0 0:X0 |
| | PSUB Sx,Sy,Du PMULS Se,Sf,Dg | | | 0 1 1 0 | | 1:X1 2:Y0 | 1:Y1 2:X0 | 1:X1 1:Y1 2:Y0 2:M0 | 1:M1 1:Y0 2:A0 2:A0 |
| | PADD Sx,Sy,Du PMULS Se,Sf,Dg | | | 0 1 1 1 | | 3:A1 | 3:A1 | 3:A1 3:A1 | 3:A1 3:A1 |
| 3 OPREAND OPERATION | VACANCY | | | 1 0 0 0 | 0 0 | 0 0 | | | Dz |
| | | | | 0 1 | | | | | 0 : (#1) |
| | PSUBC Sx,Sy,Dz | | | 1 0 | | | | | 1 : (#1) |
| | PADDC Sx,Sy,Dz | | | 1 1 | | | | | 2 : (#1) |
| | PCMP Sx,Sy | | | 0 0 | 0 1 | | | | 3 : (#1) |
| | VACANCY | | | 0 1 | | | | | 4 : (#1) |
| | PWSB Sx,Sy,Dz | | | 1 0 | | | | | 5 : A1 |
| | PWAD Sx,Sy,Dz | | | 1 1 | | | | | 6 : (#1) |
| | PABS Sx,Dz | | | 0 0 | 1 0 | | | | 7 : A0 |
| | PRND Sx,Dz | | | 0 1 | | | | | 8 : X0 |
| | PABS Sy,Dz | | | 1 0 | | | | | 9 : X1 |
| | PRND Sy,Dz | | | 1 1 | | | | | A : Y0 |
| | | | | 0 0 | 1 1 | | | | B : Y1 |
| | | | | 0 1 | | | | | C : M0 |
| | | | | 1 0 | | | | | D : (#1) |
| | VACANCY | | | 1 1 | | | | | E : M1 |
| 3 OPREAND OPERATION WITH CONDITION | [IF cc] PSHL Sx,Sy,Dz | | | 0 0 | 0 0 | IF cc | | | F : (#1) |
| | [IF cc] PSHA Sx,Sy,Dz | | | 0 1 | | 01: UN- CON- DI- TION- AL | | | |
| | [IF cc] PSUB Sx,Sy,Dz | | | 1 0 | | | | | |
| | [IF cc] PADD Sx,Sy,Dz | | | 1 1 | | | | | |
| | VACANCY | | | 0 0 | 0 1 | | | | |
| | [IF cc] PAND Sx,Sy,Dz | | | 0 1 | | | | | |
| | [IF cc] PXOR Sx,Sy,Dz | | | 1 0 | | | | | |
| | [IF cc] POR Sx,Sy,Dz | | | 1 1 | | | | | |
| | [IF cc] PDEC Sx,Dz | | | 0 0 | 1 0 | 10: DCT | | | |
| | [IF cc] PINC Sx,Dz | | | 0 1 | | | | | |
| | [IF cc] PDEC Sy,Dz | | | 1 0 | | | | | |
| | [IF cc] PINC Sy,Dz | | | 1 1 | | 11: DCF | | | |
| | [IF cc] PCLR Dz | | | 0 0 | 1 1 | | | | |
| | [IF cc] PDMSB Sy,Dz | | | 0 1 | | | | | |
| | VACANCY | | | 1 0 | | | | | |
| | [IF cc] PDMSB Sy,Dz | | | 1 1 | | | | | |
| | [IF cc] PNEG Sx,Dz | | | 1 1 0 0 | 1 0 | | | | |
| | [IF cc] PCOPY Sx,Dz | | | 0 1 | | | | | |
| | [IF cc] PNEG Sy,Dz | | | 1 0 | | | | | |
| | [IF cc] PCOPY Sy,Dz | | | 1 1 | | | | | |
| | VACANCY | | | | | 0 0 | | | |
| | [IF cc] PSTS MACH,Dz | | | 0 0 | 1 1 | IF cc | | | |
| | [IF cc] PSTS MACJ,Dz | | | 0 1 | | | | | |
| | [IF cc] PLDS Dz,MACH | | | 1 0 | | | | | |
| | [IF cc] PLDS Dz,MACL | | | 1 1 | | | | | |
| | VACANCY | | | | | 0 0 | | | |
| | | | | 0 * | | | | | |
| | VACANCY | 1 1 1 1 1 0 | | | | | | | |

(#1) SYSTEM RESERVED AREA

B FIELD

MICROCOMPUTER

This application is a continuation of application Ser. No. 08/630,320 filed on Apr. 10, 1996, now U.S. Pat. No. 5,867,726.

BACKGROUND OF THE INVENTION

The present invention relates to a logic semiconductor integrated circuit (LSI) provided with a central processing unit (CPU) and a digital signal processing unit (DSP) and formed into a semiconductor integrated circuit and an art effectively applied to a data processor (e.g. single-chip microprocessor or single-chip microcomputer) for high-speed processing.

Japanese Patent Application No. 296778/1992 (corresponding to U.S. Pat. No. 08/145157, filed Nov. 3, 1993, now abandoned) is a document describing a single-chip microcomputer in which an arithmetic and logic unit and a multiplier are mounted on the same semiconductor chip.

According to the above invention, a logic LSI chip includes a central processing unit, a bus, a memory, and a multiplier and particularly has a command signal line for transferring a command for a multiplication instruction related to read data from the central processing unit to the multiplier while reading the data out of the memory. As a result, because the command of the multiplication instruction related to read data is transferred from the central processing unit to the multiplier while the central processing unit reads data out of the memory, it is possible to directly transfer data between the memory and the multiplier.

SUMMARY OF THE INVENTION

The present inventor and others studied formation of a central processing unit and a digital signal processing unit (DSP) in a semiconductor integrated circuit (LSI) and acceleration of digital signal processing.

The above document realizes acceleration of multiplication by making it possible to directly transfer data from a memory to a multiplier. However, when assuming pipeline processing of instruction execution by a central processing unit, the above document does not consider the situation in which the fetch cycle of an instruction to be executed by a central processing unit competes with the memory access cycle for multiplication.

Moreover, the above document does not consider reading a plurality of operands for addition and multiplication out of a memory in parallel and accelerating operational processing. Furthermore, in this case, it is found by the present inventor and others that the operational easiness of a microcomputer is deteriorated unless considering the relation with external access by the central processing unit.

Furthermore, it is found by the present inventor and others that devising the assignment of codes to a CPU instruction (first instruction) and a DSP instruction (second instruction) and the format of the DSP instruction are also necessary to restrain the increase of the logic scale of an instruction decode circuit to the utmost.

It is an object of the present invention to accelerate digital signal processing by mounting a central processing unit and a digital signal processing unit on one semiconductor integrated circuit.

It is another object of the present invention to restrain the increase of the physical scale of a semiconductor integrated circuit when mounting a central processing unit and a digital signal processing unit on the semiconductor integrated circuit.

It is still another object of the present invention to provide a data processor whose operational easiness is improved and which includes a central processing unit and a digital processing unit on the same semiconductor chip.

It is still another object of the present invention to provide a data processor in which digital signal processing is accelerated.

It is still another object of the present invention to provide an instruction format (instruction set) preferably applied to a data processor including a central processing unit and a digital signal processing unit in the same semiconductor chip.

It is still another object of the present invention to provide an instruction format (instruction set) capable of restraining the increase of the logic scale of an instruction decode circuit in a data processor including a central processing unit and a digital signal processing unit in the same semiconductor chip.

The above and other objects and novel features of the present invention will become apparent from the description of this specification and the accompanying drawings.

A typical embodiment of the invention disclosed in this application is briefly described below.

That is, a semiconductor integrated circuit (microcomputer) comprises a semiconductor chip including:

a central processing unit (2);

first to third address buses (IAB, YAB, and XAB) to which an address is selectively transferred from the central processing unit;

first memories (5 and 7) connected to the first address bus (IAB) and the second address bus (YAB) and to be accessed by an address sent from the central processing unit;

second memories (4 and 6) connected to the first address bus (IAB) and the third address bus (XAB) and to be accessed by an address sent from the central processing unit;

a first data bus (IDB) for transferring data, which is connected to the first and second memories and the central processing unit;

a second data bus (YDB) for transferring data, which is connected to the first memories;

a third data bus (XDB) for transferring data, which is connected to the second memories;

an external interface circuit (12) connected to the first address bus and the first data bus;

a digital signal processing unit (3) connected to the first to third data buses and synchronously operated by the central processing unit; and a control signal line for transferring a DSP control signal (20) for controlling the operation of the digital signal processing unit from the central processing unit to the digital signal processing unit.

According to the above means, a built-in or an internal memory is divided into the following two types by considering multiply and accumulate operation: first memories (5 and 7) and second memories (4 and 6). Then, the central processing unit (2) is made possible to access the first and second memories by the third internal buses (XAB and XDB) and the second internal buses (YAB and YDB) in parallel. Thereby, it is possible to transfer two data values to the digital signal processing unit from the built-in memory at the same time.

Moreover, because the third internal buses (XAB and XDB) and the second internal buses (YAB and YDB) are also separated from the first internal buses (IAB and IDB) to be interfaced with an external unit, the central processing unit can access an external memory in parallel with the access to the second memories (4 and 6) and the first memories (5 and 7) by using the first internal buses (IAB and IDB).

Thus, because the data processor of the present invention has three internal address buses (IAB, XAB, and YAB) and three internal data buses (IDB, XDB, and YDB) in the first to third internal buses connected to the central processing unit (2), the processor can access different memories at the same clock cycle by using the first to third internal buses. Therefore, even if a program or data is present in an external memory, the data processor of the present invention can easily accelerate arithmetic processing.

To improve the operational easiness of a microcomputer, the first and second memories are preferably are RAM and ROM, respectively.

To accelerate generation of addresses for repetition of the multiply and accumulate operation in the central processing unit, it is preferable to provide a modulo address output portion (200) for the central processing unit. In this case, it is preferable that an address generated by the modulo address output portion can selectively be output to the second or third address bus.

The digital signal processing unit includes first to third data buffer means (MDBI, MDBY, and MDBX) to be individually interfaced with the first to third data buses (IDB, YDB, and XDB), a plurality of register means (305 to 308) being made connectable to each data buffer means through an internal bus, a multiplier (304) and an arithmetic and logic operation unit (302) connected to the internal bus, and a decoder (34) for decoding the DSP control signal and controlling operations of the data buffer means, multiplier, arithmetic and logic operation unit, and register means.

For instruction decoding, a data processor (microcomputer) is formed into a single semiconductor integrated circuit chip including the central processing unit (2), the memories (4 to 7) to be accessed and controlled by the central processing unit, a data bus for transferring data between the memories and the central processing unit, and the digital signal processing unit (3).

An instruction set executable by the microcomputer includes a CPU instruction (first instruction) to be executed by the central processing unit (2) and a DSP instruction to be executed by the digital signal processing unit (3) by making the central processing unit perform some types of processing including address computation for data fetch.

The central processing unit includes an instruction register (25) for fetching a 16-bit fixed-length (first bit length) CPU instruction and a 16-bit or 32-bit (second bit length) DSP instruction through the data bus and a decoder (24) for discriminating the CPU instruction from the DSP instruction in accordance with a plurality of bits of some of the commands fetched by the instruction register and generating a DSP control signal (20) for controlling operations of the digital signal processing unit and a CPU control signal for controlling operations of the central processing unit in accordance with the discrimination result.

For example, a CPU instruction is assigned to a range in which the 4 high-order bits of an instruction code are set to "0000" to "1110". A DSP instruction is assigned to a range in which 4 high-order bits of an instruction code are set to "1111". Moreover, 6 high-order bits of an instruction code are used as a "111100" instruction code. An instruction in which 6 high-order bits of an instruction code are set to "111110" is used as a 32-bit instruction code. However, no instruction is assigned to a range in which 6 high-order bits of an instruction code are set to "111111" and the range is used as a vacancy.

Thus, by providing the above rule for assignment of codes to up to 32-bit instructions and thereby decoding a part of each instruction code, that is, 6 high-order bits, it is possible to decide by a decoder with a small logic scale whether the instruction is a CPU instruction, a 16-bit DSP instruction, or a 32-bit DSP instruction. Therefore, it is not necessary to always decode 32 bits at the same time.

The decoder includes a first decode circuit (240) for decoding 6 high-order bits of an instruction register and generating the CPU decode signal (243) and the DSP decode signal (244) and a code converting circuit (242) for outputting a signal obtained by coding 16 low-order bits of an instruction register when discriminating a 32-bit DSP instruction by the first decode circuit and a code representing that the output is invalid when discriminating an instruction other than the 32-bit DSP instruction. The DSP decode signal and the output of the code converting circuit are used as the DSP control signal (20).

When noticing the point of the instruction format of the DSP instruction, a microcomputer is formed into a semiconductor integrated circuit including the central processing unit (2), the digital signal processing unit (3) to be synchronously operated by the central processing unit, and the internal bus (IDB) to which the central processing unit and the digital signal processing unit are connected in common. The central processing unit is provided with execution control means for executing an instruction of a first format having a first code area (bit 9 to bit 0 of the 16-bit DSP instruction shown in FIG. 18) for specifying data transfer to and from the digital signal processing unit for the central processing unit and an instruction of a second format having a second code area (field A of the 32-bit DSP instruction shown in FIGS. 20 and 21) with the same format as the first code area and a third code area (field B of the 32-bit DSP instruction shown in FIGS. 20 and 21) for specifying operational processing using the transferred data specified in-the second code area for the digital signal processing unit.

Thereby, when executing the instruction of the first format and the instruction of the second format respectively, the execution control means can adopt decode means having decode logic common to the first and second code areas, and this contributes to decrease of the logic scale of a microcomputer.

The instruction of the first format and the instruction of the second format have a fourth code area (e.g. bit 15 to bit 10 in a 16-bit DSP instruction or bit 32 to bit 26 in a 32-bit DSP instruction) for indicating tire first format or the second format.

The execution control means includes the instruction register (25) used for the instruction of the first format and the instruction of the second format in common, the decode means (240) for deciding the first and fourth code areas or the second and fourth code areas included in an instruction fetched by the instruction register, and execution means for performing address computation in accordance with the decoded result and performing the data transfer control.

The instruction register is provided with a high-order area (UIR) shared to hold the first and fourth code areas or the second and fourth code areas and a low-order area used to hold the third code area. The decode means includes means (242, 242A, and 242B) for outputting a control signal (248) showing that the instruction register holds the instruction of the second format in accordance with the decoded result of the fourth code area and supplying code data in the third code area from the low-order area to the digital signal processing unit.

BRIEF DESCRIPTION OF THE DRAWINGS

FIG. 2 is an address map of a microcomputer;

FIG. 5 is an illustration of an instruction format and an instruction code of a microcomputer;

FIG. 18 is an instruction format diagram showing the code of a 16-bit DSP instruction for specifying data transfer between a built-in memory of a microcomputer and a built-in register of a DSP engine;

FIG. 19 is an instruction format diagram showing the code of a 16-bit DSP instruction for specifying data transfer between an external memory of a microcomputer and a built-in register of a DSP engine;

FIG. 20 is an instruction format diagram showing codes in a field and mnemonics corresponding to the codes when noticing field B of a 32-bit DSP instruction; and FIG. 21 is an instruction format diagram showing codes in a field and mnemonics corresponding to the codes when noticing field B of a 32-bit DSP instruction.

DESCRIPTION OF THE PREFERRED EMBODIMENTS

Figure 1:
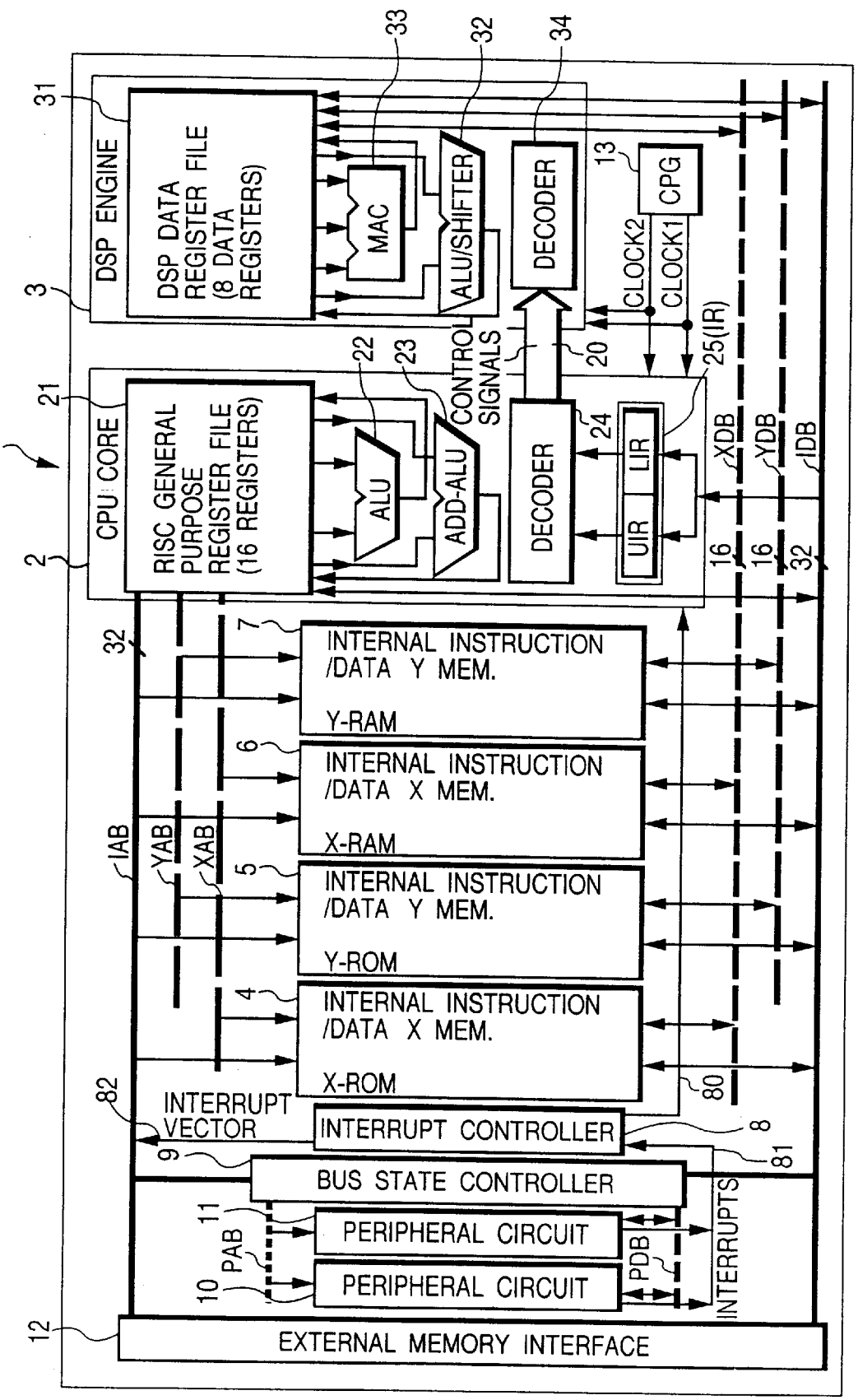
FIG. 1 is an entire block diagram of the microcomputer of an embodiment of the present invention.

FIG. 1 shows an entire block diagram of a single-chip microcomputer (single-chip microprocessor) serving as the data processor of an embodiment of the present invention.

The microcomputer shown in FIG. 1 is formed on a semiconductor substrate made of, for example, single-crystal silicon by a semiconductor integrated circuit process. The microcomputer 1 comprises a CPU core 2 serving as a central processing unit, a DSP engine 3 serving as a digital signal processing unit, an X-ROM 4, a Y-ROM 5, an X-RAM 6, a Y-RAM 7, an interrupt controller 8, a bus state controller 9, built-in or on-chip peripheral circuits 10 and 11, an external memory interface 12, and a clock pulse generator (CPG) 13.

The X-ROM 4 and the Y-ROM 5 are read-only memories or electrically erasable programmable memories for storing instructions or constant data. The X-RAM 6 and the Y-RAM 7 are random access memories used to temporarily store data or used as work areas of the CPU core 2 and the DSP engine 3. The X-ROM 4 and the X-RAM 6 are generally called internal instruction/data X memories and the Y-ROM 5 and the Y-RAM 7 are generally called internal instruction/data Y memories. The Y-ROM 5 and Y-RAM 7 serve as first memories and the X-ROM 4 and X-RAM 6 serve as second memories.

The bus of the microcomputer 1 of this embodiment includes the internal address bus IAB and internal data bus IDB which are connected to the external memory interface 12, the internal address bus XAB and internal data bus XDB which are not connected to the external memory interface 12, the internal address bus YAB and internal data bus YDB which are not connected to the external memory interface 12, and a peripheral address bus PAB and a peripheral data bus PDB which are used for the built-in peripheral circuits 10 and 11. A control bus, though not illustrated, is provided correspondingly to three sets of address bus and data bus respectively.

The data bus IDB connectable with the outside of a chip through the external memory interface 12 is connected to the CPU core 2, and an interrupt signal 80 is supplied to the CPU core 2 from the interrupt controller 8. The CPU core 2 supplies a control signal 20 for controlling the DSP engine 3 to the DSP engine 3. Moreover, the CPU core 2 outputs an address signal to the address bus IAB connectable with the outside of a chip through the external memory interface 12 and the address buses XAB and YAB which are not connected to the external memory interface 12. The CPU core 2 is operated by using non-overlap two-phase clock signals Clock 1 and Clock 2 output from a clock pulse generator (CPG) 13 as operation reference clock signals. Though the detail of the CPU core 2 is described later, a register file 21, an arithmetic and logic unit (ALU) 22, an address adder (Add-ALU) 23, a decoder 24, and an instruction register (IR) 25 are typically illustrated in the CPU core 2 of FIG. 1.

The register file 21 is optionally used as an address register or data register and includes a program counter and a control register. The decoder 24 decodes an instruction fetched by the instruction register 25 and generates an internal control signal (not illustrated in FIG. 1) and the control signal 20. The instruction register (IR) 25 comprises a 16-bit high-order area (UIR) and a 16-bit low-order area (LIR). Though the detail is described later, the value of the low-order area (LIR) is selectively made shiftable to the high-order area (UIR). A sequence control circuit is not illustrated which controls an instruction execution procedure when an exception such as an interrupt occurs or controls save or return of an internal state for occurrence of the exception by using hardware.

The DSP engine 3 is connected to the data buses IDB, XDB, and YDB and operated by using the clock signals Clock 1 and Clock 2 as operation reference clock signals. Though the detail of the DSP engine 3 is described later, a data register file 31, an arithmetic and logic unit and shifter (ALU/Shifter) 32, a multiplier (MAC) 33, and a decoder 34 are typically illustrated in the DSP engine 3 of FIG. 1. The data register file 31 is used for multiply and accumulate operation. The decoder 34 decodes the control signal 20 supplied from the CPU core 2 and generates an internal control signal (not illustrated in FIG. 1) of the DSP engine 3.

The X-ROM 4 and the X-RAM 6 are connected to the address bus IAB and the data buses IDB and XDB. The Y-ROM 5 and the Y-RAM 7 are connected to the address buses IAB and YAB and the data buses IDB and YDB. The built-in memories (X-ROM 4 and X-RAM 6, and Y-ROM 5 and Y-RAM 7) are divided into the X-memories 4 and 6 and the Y-memories 5 and 7 by considering the multiply and accumulate operation by the DSP engine 3 and made accessible in parallel by the internal buses XAB and XDB, and YAB and YDB respectively. Moreover, because the internal buses XAB and XDB, and YAB and YDB are separated from the buses IAB and IDB to be interfaced with the outside of the chip of the microcomputer 1, access to an external memory is possible in parallel with the access to the X memories 4 and 6 and the Y memories 5 and 7. The X memories 4 and 6 and the Y memories 5 and 7 are used as a temporary data storage area of a constant data storage area for the multiply and accumulate operation by the DSP engine. It is needless to say that the X-RAM and Y-RAM can be used as temporary data storage areas or work areas of the CPU core 2.

The interrupt controller 8 receives an interrupt a request signal (Interrupts) 81 from the built-in peripheral circuit 10 or 11, arbitrates and accepts an interrupt request in accordance with the information for priority setting of various interrupt requests and masking for interrupt requests, outputs an interrupt vector address signal 82 corresponding to an accepted interrupt request to the address bus IAB, and moreover outputs the interrupt signal 80 to the CPU core 2.

The bus state controller 9 is connected to the address buses IAB and PAB and the data buses IDB and PDB and controls the interface between the built-in peripheral circuits 10 and 11 connected to the address bus PAB and the data bus PDB on one hand and the CPU core 2 on the other.

The external memory interface 12 is connected to the address bus IAB and the data bus IDB and moreover connected to an external address bus (not shown) at the outside of the chip of the microcomputer 1 to control the interface with an external unit.

FIG. 2 shows a map of the address space of the microcomputer 1.

The microcomputer of this embodiment controls an address space specified with 32 bits. The address bus IAB has a width of 32 bits. The address space includes an exception vector table area, an X-ROM address space (address space assigned to the X-ROM 4), an X-RAM address space (address space assigned to the X-RAM 7), a Y-ROM address space (address space assigned to the Y-ROM 5), a Y-RAM address space (address space assigned to the Y-RAM 7), and a on-chip peripheral register field (address space to which the built-in peripheral circuits 10 and 11 are assigned). In the case of FIG. 2, 24 KB are assigned to the X-ROM 4, 4 KB are assigned to the X-RAM 6, 24 KB are assigned to the Y-ROM 5, and 4 KB are assigned to the Y-RAM 7.

According to FIG. 2, the address space of the microcomputer 1 can be assigned as follows.

An exception vector table area is assigned to a 256B area in address spaces of H'100000000 to H'000003FF shown by the hexadecimal notation. A normal address space usable by a user is assigned to H'00000400 to H'01FFFFFF. The normal address space is used as a memory area connectable with the outside of the microcomputer 1. An X-ROM address space is assigned to H'02000000 to H'02005FFF. An X-RAM address space is assigned to H'02006000 to H'02006FFF.

H'02007000 to H'02007FFF are used as an X-RAM_Mirror address space. Accessing the X-RAM_Mirror address space actually represents the access to an X-RAM address space of H'02006000 to H'02006FFF. H'02008000 to H'0200FFF are used as X-RAM and RAM_Mirror address spaces. Accessing these address spaces actually represent the access to X-ROM and X-RAM address spaces of H'02000000 to H'02007FFF. A Y-ROM address space is assigned to H'02010000 to H'02015FFF. A Y-RAM address space is assigned to H'02016000 to H'02016FFF.

H'02017000 to H'02017FFF are used as a Y-RAM_Mirror address space. Accessing the Y-RAM_Mirror address space actually represent the access to a Y-RAM address space of H'0201600 to H'02016FFF. H'02018000 to H'0201FFFF are used as a Y-ROM and RAM_Mirror address spaces. Accessing these spaces actually represents the access to Y-ROM and Y-RAM address spaces of H'02010000 to H'02017FFF. A normal address space is assigned to H'02020000 to H'07FFFFFF.

A reserved area is assigned to H'08000000 to H'1FFFFFFF. The reserved area cannot be accessed in the case of a user chip (actual chip) but it is assigned as an ASE address space (control address space for emulation) in the case of an evaluation chip (for evaluation used for emulation or the like). A normal address space is assigned to H'20000000 to H'27FFFFFF. A reserved area is assigned to H'28000000 to H'FFFFFDFF. A on-chip peripheral register area to which a register address value of a built-in peripheral circuit should be assigned is assigned to H'FFFFFE00 to H'FFFFFFFF.

Figure 3:
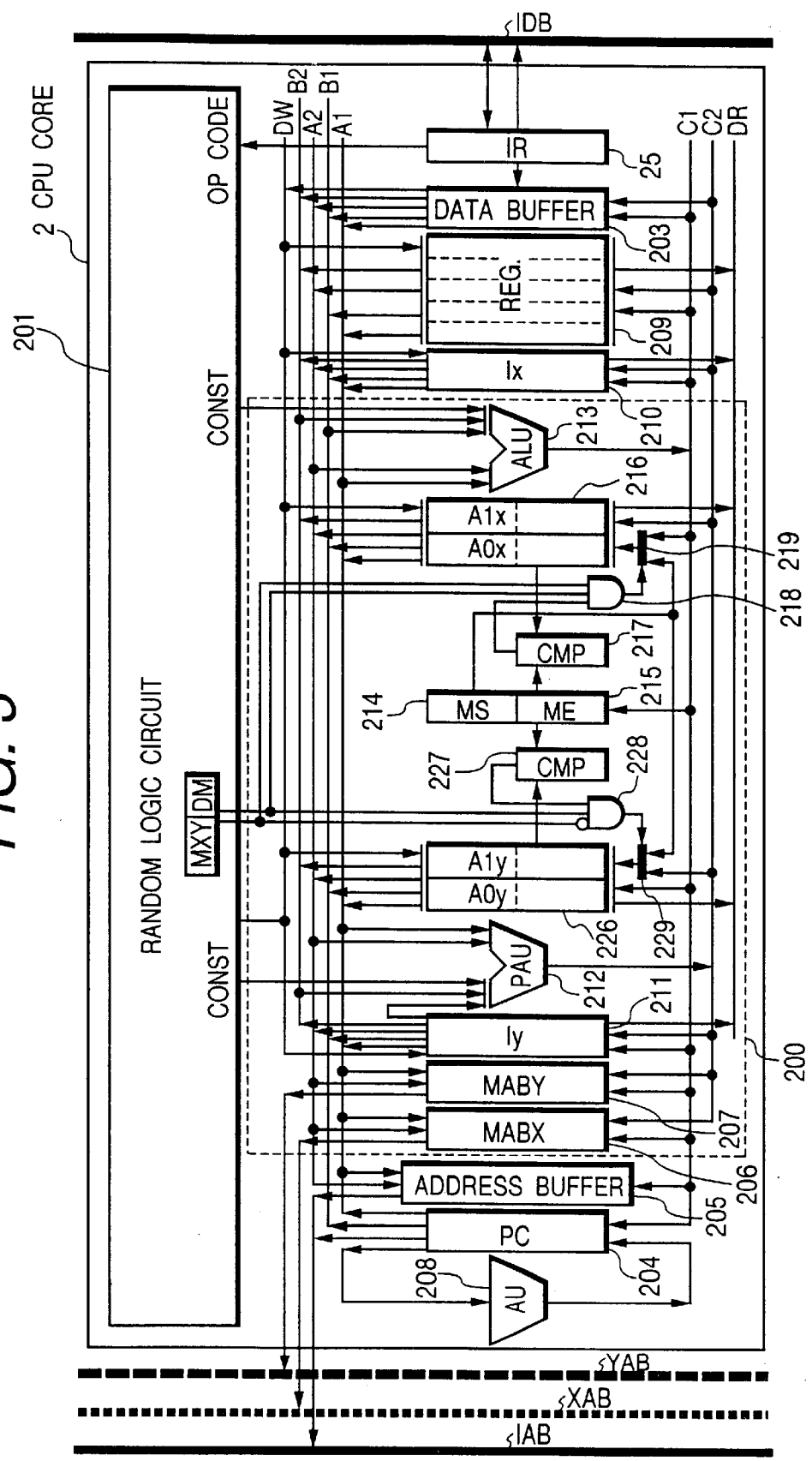
FIG. 3 is a block diagram of a CPU core showing a modulo address output portion in detail.

FIG. 3 shows a block diagram of the CPU core 2 whose modulo address output portion is shown in detail.

A portion enclosed by a broken line in FIG. 3 represents a modulo address output portion 200. The modulo address output portion 200 is a circuit block for performing address update and output operations for outputting a value output from a modulo address register (e.g. AOX) to an address bus (e.g XAB) through a buffer (e.g. MABX) and moreover adding a value output from the modulo address register (AOX) by summing means (e.g. ALU) and storing the value in the modulo address register (AOX) again and sequentially updates and generates a data access address for repetitive operation such as multiply and accumulate operation. The circuit block shown as a random logic circuit 201 is a circuit block including the decoder 24 in FIG. 1, the sequence control circuit, and a control register and a status register.

In FIG. 3, C1, C2, DR, A1, B1, A2, B2, and DW are typical buses in the CPU core 2. The CPU core 2 and the data bus IDB are interfaced through the instruction register (IR) 25 and a data buffer 203. An instruction fetched by the instruction register (IR) 25 is supplied to the decoder 24 or the like included in the random logic circuit 201. The CPU core 2 and the address bus IAB are interfaced through a program counter (PC) 204 and an address buffer 205. The CPU core 2 and the address bus XAB are interfaced through memory address buffer (MABX) 206, and the CPU core 2 and the address bus YAB are interfaced through a memory address buffer (MABY) 207.

The input path of address information to the address buffer 205 can be selected out of the buses C1, A1, and A2, and the input path of address information to the memory address buffers 206 and 207 ban be selected out of the buses C1, C2, A1, and A2. An arithmetic unit (AU) 208 is used for increment of the program counter 204. In FIG. 3, symbol 209 represents a general-purpose register (Reg.), 210 represents an index register (Ix) used for indexing an address, 211 represents a index register (Iy) also used for indexing an address, 212 represents an adder (PAU) dedicated to address computation, and 213 represents an arithmetic and logic unit (ALU).

A control bit MXY designates address bus XAB or YAB to which modulo arithmetic should be applied. The address bus XAB is designated by the logical value "1" of the control bit MXY. The address bus YAB is designated by the logical value "0" of the control bit MXY.

A control bit DM designates whether to perform modulo arithmetic. It is designated to perform the modulo arithmetic by the logical value "1" of the control bit DM. Moreover, it is designated by the logical value "0" of the control bit DM that modulo arithmetic is not performed. A modulo start address register (MS) 214 stores a modulo arithmetic start address and a modulo end address register (ME) 215 stores a modulo arithmetic end address.

A modulo address register (A0x, A1x) 216 is a current address register for storing a current modulo address. Numeral 217 represents a comparator (CMP) for comparing a value of the modulo end address register (ME) 215 with a value of the modulo start address register (A0x, A1x) 216. Numeral 218 represents an AND gate for the logical product of the output from the comparator 217, and control bits MXY and DM. Symbol 219 represents a selector for selecting a value of the bus C1 and a value of the modulo start address register (MS) 214. These value are used for the modulo arithmetic for the address bus XAB.

The selector 219 selects a value of the register (MS) 214 according to the logical-value "1" output of the AND gate 218 and supplies the selected value to the modulo address register (A0x, A1x) 216. Either A0x or A1x of the modulo address register 216 is selected and used.

A modulo address register (A0y, A1y) 226 is a current address register for storing a current modulo address. Symbol 227 represents a comparator (CMP) for comparing a value of the modulo address register (ME) 215 with a value of the modulo address register (A0y, A1y) 216. Symbol 228 represents an AND gate for the logical product of the output of the comparator 227, and the inversion of the control bit MXY and the control bit DM. Symbol 229 represents a selector for selecting a value of the bus C and a value of the modulo start address register (MS) 214. These values are used for the modulo arithmetic for the address bus YAB.

The selector 229 selects a value of the register (MS) 214 in accordance with the logical-value "1" output of the AND gate 228 and supplies the selected value to the modulo address register (A0y, A1y) 226. Either A0y or A1y of the modulo address register 226 is selected and used.

The OP Code entered in the random logic circuit 201 represents an instruction code supplied from the instruction register 25 and the CONST represents a constant value.

An operation is described below as the modulo arithmetic by the CPU core 2, in which address information to be supplied to the address bus XAB is generated by modulo arithmetic by using, for example, the modulo address register (A0x) 216.

First, the modulo arithmetic start address is written in the modulo start address register (MS) 214 and the modulo arithmetic end address is written in the modulo end address register (ME) 215. An address value for starting modulo arithmetic is written in the modulo address register (A0x).

Then, to apply modulo arithmetic to an address of the address bus XAB, the logical value "1" is written in the control bit MXY for deciding which the modulo-arithmetic should be applied to, an address of the XAB or an address of the YAB (when applying the modulo arithmetic to the address bus YAB, the logical value "0" is written in the control bit MXY). Finally, the logical value "1" is written in the control bit DM for deciding whether to perform modulo arithmetic.

A modulo arithmetic instruction is described as, for example, MOVS.W@Ax or Dx. In the case of this instruction description, Ax is used for the modulo address register (A0x) 216 or modulo address register (A1x) 216 and Dx corresponds to a register in the DSP engine 3. In FIG. 3, Dx is not illustrated.

When the modulo arithmetic instruction is executed, a value is read by the modulo address register (A0x) 216 and input to the memory address buffer (MABX) 206 and the arithmetic and logic unit (ALU) 213. The value input to the memory address buffer (MABX) 206 is directly output to the address bus XAB to designate an address of the XROM 4 or XRAM 6.

A value of the index register (Ix) 210 or a constant is added to the value of the modulo address register (A0x) 216 input to the arithmetic and logic unit (ALU) 213. Addition with the index register (Ix) 210 is performed when an instruction MOVS.W@(Ax, Ix) or Dx is executed. A constant (Const) is added when an instruction MOVS.W @Ax, Dx or the like is executed. The addition result is output from the arithmetic and logic unit (ALU) 213. The value output from the arithmetic and logic unit (ALU) 213 is input to the selector 219. Another input of the selector 219 is the modulo arithmetic start address stored in the modulo start address register (MS) 214.

Whether the output of the selector 219 serves as an output of the arithmetic and logic unit (ALU) 213 or that of the modulo start address register (MS) 214 is determined as shown below.

A value of the modulo address register (A0x) 216 and a value of the modulo address register (ME) 215 are always compared by the comparator (CMP) 217. When these values are matched each other, the logical value "1" is output from the comparator (CMP) 217. When they are mismatched, the logical value "0" is output from the comparator. The logical product of a value output from the comparator (CMP) 217 is computed by the AND gate 218 together with the control bits DM and MXY (in this case, because both DM and MXY have the logical value "1", a value of the comparator 217 is directly output from the AND gate 218) and input to the selector 219. The selector 219 selects a value of the modulo start address register (MS) 214 when a value input from the AND gate 218 is the logical value "1" but selects a value output from the arithmetic and logic unit (ALU) 213 when the value input from the AND gate 218 is the logical value "0".

While a value input from the AND gate 218 is the logical value "0", the selector 219 continuously selects a value output from the arithmetic and logic unit (ALU) 213. Therefore, a value output to the address bus XAB is sequentially updated. When a value of the modulo end address register (ME) 215 matches a value of the modulo address register (A0x) 216, a value input to the selector 219 from the AND gate 218 is set to the logical value "1" to select a value of the modulo start address register (MS) 214. Thereby, the modulo address register (A0x) 216 is initialized by the value of the modulo start address register (MS) 214.

In the above description of the modulo arithmetic, the operation when using the modulo address register (A0x) 216 is described. However, it is also possible to designate Ax in the modulo arithmetic instruction MOVS.W@Ax or Dx to the modulo address register (A1x) 216. Moreover, by designating the logical value "0" to the control bit MXY, modulo arithmetic can be performed for the address bus YAB. In this case, Ax in the modulo arithmetic instruction MOVS.W@Ax or Dx must be changed to a value Ay for designating the modulo address register (A0y) 226 or (A1y) 226. When designating 0 to the control bit DM, it is possible to inhibit the execution of modulo arithmetic.

Figure 4:
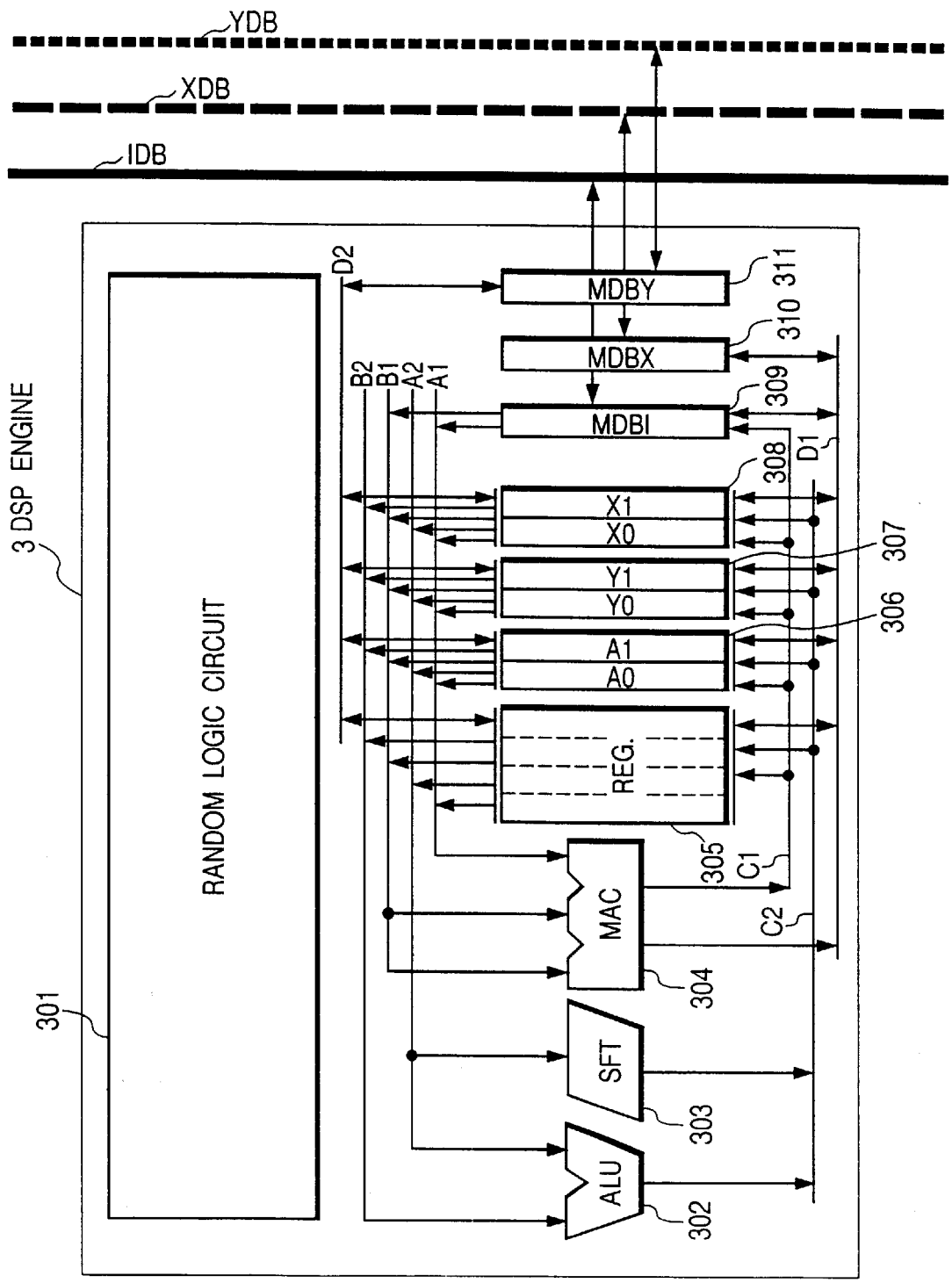
FIG. 4 is a block diagram of a DSP engine.

FIG. 4 shows a block diagram of the DSP engine 3.

The circuit block shown as a random logic circuit 301 includes the decoder 34 and control circuit in FIG. 1 and moreover, a control register and a status register. Moreover, the DSP engine 3 is provided with an arithmetic and logic unit (ALU) 302, a shifter (SFT) 303, a multiplier (MAC) 304, a register (Reg.) 305, a register (A0, A1) 306, a register (Y0, Y1) 307, a register (X0, X1) 308, a memory data buffer (MDBI) 309, a memory data buffer (MDBX) 310, and a memory data buffer (MDBY) 311.

The memory data buffer (MDBY) 311 connects the data bus YDB with the bus D2. The memory data buffer (MDBX) 310 connects the data bus XDB with the bus D1. The memory data buffer (MDBX) 309 connects with the data bus IDB and the buses C1, D1, A1, and B1.

The multiplier (MAC) 304, inputs data from the buses A1 and B1 and outputs the multiplication result of the data to the buses C1 and D1. The shifter (SFT) 303 inputs data from the bus A2 and outputs the shift operation result to the bus C2. The arithmetic and logic unit (ALU) 302 inputs data from the buses A2 and B2 and outputs the operation result to the bus C2.

FIG. 5 shows an instruction format and an instruction code included in the instruction set of the microcomputer 1.

The microcomputer 1 supports the following two types of instructions: CPU instruction (first instruction) and DSP instruction (second instruction). All CPU instructions and some of DSP instructions are instruction codes of 16-bit length (first bit length). Remaining DSP instructions are instruction codes of 32-bit length (second bit length).

In this specification, a CPU instruction is defined as an instruction to be exclusively executed by the CPU core 2 without operating the DSP engine 3. A DSP instruction is defined as an instruction to be executed by the DSP engine 3 by making the CPU core 2 perform some processing such as address arithmetic or operand access.

In the case of a CPU instruction, 4 high-order bits of an instruction code are assigned to an address space from "0000" to "1110". In the case of a DSP instruction, 4 high-order bits of an instruction code are all assigned to "1111". Moreover, in the case of even a DSP instruction in which 6 high-order bits of an instruction code are assigned to "111100" and "111101", it has a 16-bit instruction code. An instruction in which 6 high-order bits of an instruction code are assigned to "111110" has a 32-bit instruction code. Because no instruction is assigned to an address space in which 6 high-order bits of an instruction code are "111111" and therefore, the address space is a vacant area (undefined instruction area). It is possible to further extend an instruction code by using the area in future.

As understood from the instruction format, by decoding 6 high-order bits of each instruction, it is possible to judge by a decoder with a small logic scale whether the instruction concerned is a CPU instruction, a 16-bit DSP instruction, a 32-bit DSP instruction, or an undefined instruction.

In the CPU instruction format in FIG. 5, nnnn represents a destination-operand designated area, ssss represents a source-operand designated area, dddd represents a displacement designated area, and iiiiiiii represents an immediate-value designated area. In the case of an ADD instruction, nnnn is also used as a source-operand designated area and arithmetic results are stored in nnnn. The modulo arithmetic instruction described by referring to FIG. 3 corresponds to the instruction MOVS.W@R2 or A0 in FIG. 5. However, in the case of the instruction description in FIG. 5, the form of describing operand designation is different from the content described in FIG. 3. However, this is mere difference in type but the essense is the same.

Figure 6:
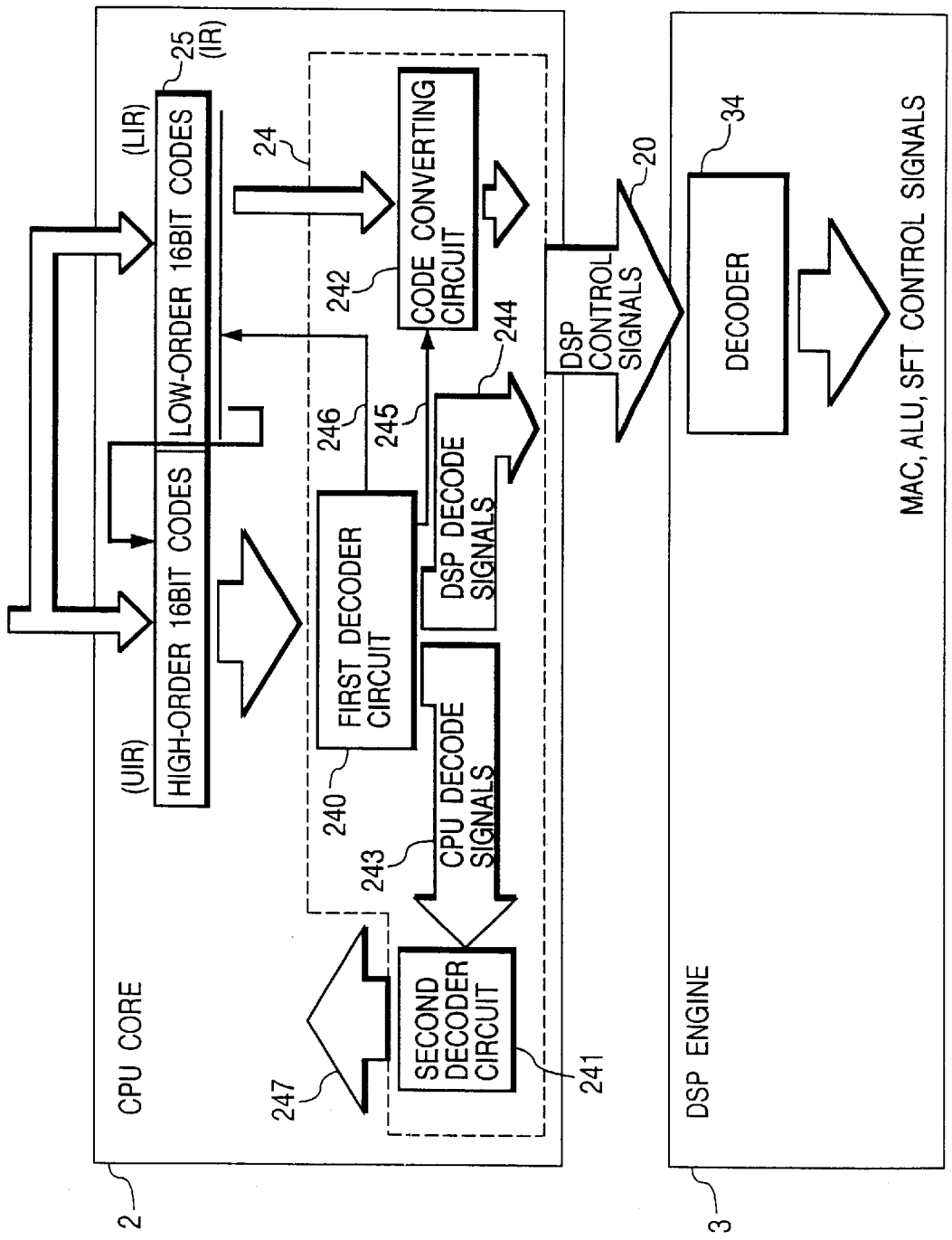
FIG. 6 is a block diagram showing the connective structure between a CPU-core decoder and a DSP engine decoder.

FIG. 6 shows a connective structure between the decoder 24 of the CPU core 2 and the decoder 34 of the DSP engine 3.

Instruction fetch by the microcomputer 1 is performed by the instruction register (IR) 25 every 32 bits. The decoder 24 is provided with a first decode circuit 240, a second decode circuit 241, and a code conversion circuit 242.

The first decode circuit 240 decodes a value in the high-order 16-bit area (UIR) of the instruction register (IR) 25 and generates a CPU decode signal 243, a DSP decode signal 244, a code conversion control signal 245, and shift control signal 246 in accordance with the fact that the instruction concerned is a CPU instruction, a 16-bit DSP instruction, or a 32-bit DSP instruction.

The second decode circuit 241 decodes the CPU decode signal 243 and generates various internal control signals (CPU control signals) 247 for selecting an arithmetic unit or a register in the CPU core 2.

When the code conversion circuit 242 is activated by the code conversion control signal 245, it compresses or directly outputs the number of bits for the information held by the low-order 16-bit area (LIR) of the instruction register (IR) 25. When the circuit 242 is deactivated by the code conversion control signal 245, it outputs information (non-operation code) representing that its output is invalid.

It is also possible to realize the code conversion circuit 242 by a selector in order to output a non-operation code instead of a value of the low-order 16-bit area (LIR) when the signal 245 is inactive. The DSP decode signal 244 and an output of the code conversion circuit 242 are supplied to the decoder 34 of the DSP engine 3 as the DSP control signal 20. The first decode circuit 240 is able to decide that the instruction concerned is a CPU instruction, a 16-bit DSP instruction, or a 32-bit DSP instruction by decoding 6 high-order bits stored in the high-order 16-bit area (UIR) of the instruction register (IR) 25.

When a decoded instruction is a 16-bit instruction, the code conversion control signal 245 is deactivated and thereby, the code conversion circuit 242 outputs a non-operation code representing that output is invalid. When the decoded instruction is a 16-bit instruction, the shift control signal 246 is activated and the instruction register (IR) 25 receiving the signal 246 shifts a value in the loworder 16-bit area (LIR) to the high-order 16-bit area (LIR) to use the shifted instruction as the whole or part of the instruction to be next executed.

For example, a case is described below in which a 16-bit CPU instruction is stored in the high-order 16-bit area of the instruction register IR and a highorder 16-bit instruction code of a 32-bit DSP instruction is stored in the low-order bit area LIR. First, the 16-bit CPU instruction stored in the high-order 16-bit area UIR is decoded by the first decode circuit 240, the CPU core 2 executes the instruction according to the result, and the high-order 16-bit instruction code data of the 32-bit DSP instruction stored in the low-order 16-bit area LIR is transferred to the high-order 16-bit area UIR. In this case, the random logic circuit 201 makes the arithmetic operation unit (AU) 208 execute address arithmetic of an address to be stored in the program counter PC. The program counter PC stores an address following the address arithmetic result computed by the arithmetic unit AU 208. In accordance with the address stored in the program counter PC, the low-order 16-bit instruction code data of the 32-bit DSP instruction is transferred from the instruction memory storing the data to the low-order 16-bit area LIR of the instruction register IR. Thereby, the 32-bit DSP instruction is stored in the instruction register IR. Then, the 32-bit DSP instruction stored in the instruction register IR is supplied to the decoder 34 of the DSP engine 3 through the decoder 24.

Moreover, as other method, a plurality of instruction prefetch buffers are provided in the CPU core 2 through they are not illustrated. These instruction prefetch buffers prefetch the instructions to be executed several cycles ahead from an instruction currently executed. When these prefetch buffers are used and the high-order 16-bit instruction code data of the 32-bit DSP instruction is transferred from the low-order area LIR to the high-order 16-bit area UIR as described above, the random logic circuit 201 selects an instruction prefetch buffer by which the low-order 16-bit instruction code data of the 32-bit DSP instruction is fetched. The low-order 16-bit instruction code data of the 32-bit DSP instruction is read out of the selected instruction prefetch buffer and stored in the low-order 16-bit area LIR of the instruction register IR.

When the decoded instruction is a 16-bit CPU instruction, the DSP decode signal 244 is used as a code representing non-operation. When the decoded instruction is a 16-bit DSP instruction, the second decode circuit 241 generates the CPU control signal 247 in accordance with the CPU decode signal 243 and the decoder 34 generates a control signal in the DSP engine 3 by substantially decoding the DSP decode signal 244. When the decoded instruction is a 32-bit DSP instruction, the second decode circuit 241 generates the CPU control signal 247 in accordance with the CPU decode signal 243 and the decoder 34 generates a control signal in the DSP engine 3 by decoding the DSP decode signal 244 and an output of the code conversion circuit 242.

The instruction set of the microcomputer 1 includes instruction codes of 16 bit length and 32 bit length. However, because a 16-bit instruction is different from a 32-bit instruction in processing, the operation of each case is separately described below in detail.

First, the case of a 16-bit instruction is described.

The first decode circuit 240 decodes 16 high-order bits of a 32-bit instruction code fetched by the instruction register (IR) 25. The first decode circuit 240 can detect that the instruction concerned is a 16-bits instruction unless 6 high-order bits of an instruction code are "111110" or "11111". In this case, the shift control signal 246 for shifting the instruction code data of low-order 16-bit area LIR of the instruction register (IR) 25 is activated together with outputs of the CPU decode signal 243 and DSP decode signal 244.

The instruction register (IR) 25 receiving the activated shift control signal 246 shifts an instruction code stored in the low-order 16-bit area LIR to the high-order 16-bit area UIR. The shifted instruction code is then decoded by the first decode circuit 240. The CPU decode signal 243 output from the decoder 24 is output to the second decode circuit 241 and the DSP decode signal 244 is supplied to the DSP engine 3. When the first decode circuit 240 detects a 16-bit instruction, it deactivates the code conversion control signal 245. Thereby, the code conversion circuit 242 generates a code showing that a low-order 16-bit instruction code is invalid as a part of the DSP control signal 20.

When the DSP engine 3 receives the DSP decode signal 244 output from the first decode circuit 240 and a code signal output from the code conversion circuit 242 as the DSP control signals 20, decoder 34 decodes the DSP control signals 20. In the case of a 16-bit DSP instruction, the DSP control signal output from the code conversion circuit 242 serves as a signal representing invalidness. Therefore, the decoder 34 notices the DSP decode signal 244 and outputs control signals for the multiplier (MAC) 304, arithmetic and logic unit (ALU) 302, and shifter (SFT) 303 in the DSP engine 3. The DSP engine 3 performs arithmetic processing in accordance with these control signals.

Then, the case of a 32-bit instruction is described below.

The first decode circuit 240 in the CPU core 2 stores a 32-bit instruction code in the instruction register (IR) 25. Then, the first decode circuit 240 decodes 16 high-order bits of the instruction code and outputs the decode signals 243 and 244. Because the first decode circuit 240 can detect that the instruction concerned is a 32-bit instruction when a high-order 16-bit code of the instruction code is set to "111110", it activates the code conversion control signal 245. Thereby, the code conversion circuit 242 applies code conversion to a low-order 16-bit instruction code of the instruction register (IR) 25. Code-converted information is supplied to the DSP engine 3 together with the DSP decode signal 244 as the DSP control signals 20. The decoder 34 decodes the DSP control signals 20 and generates a control signal in the DSP engine 3. The decoders 24 and 34 can be realized by, for example, a random logic circuit.

Figure 17:
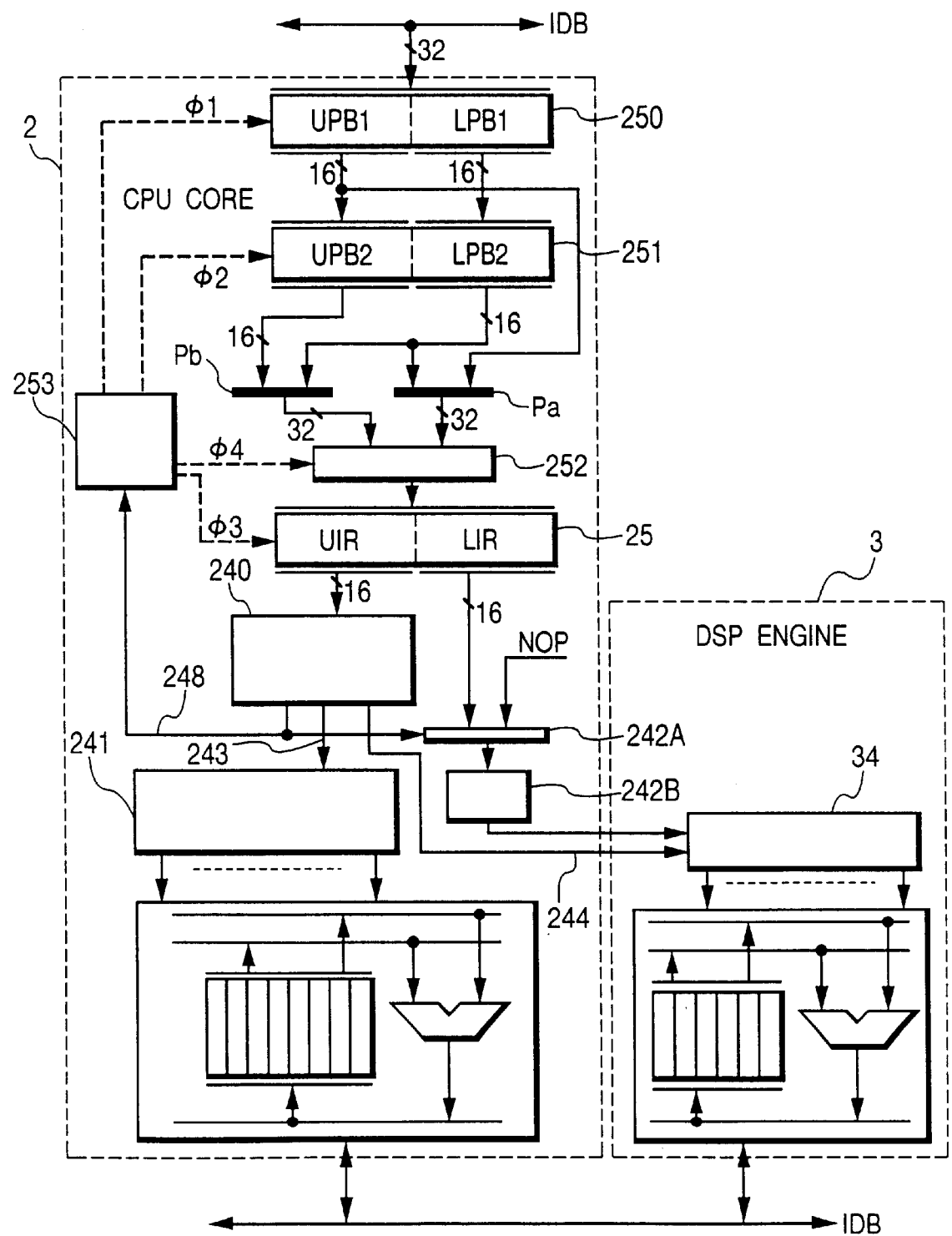
FIG. 17 is a block diagram showing another embodiment corresponding to FIG. 6.

FIG. 17 shows another embodiment corresponding to the embodiment in FIG. 6.

In the case of the embodiment in FIG. 6, it is described that instruction data in the low-order area LIR of the instruction register 25 is shifted to the high-order area UIR.

In the case of the embodiment in FIG. 17, two-stage series instruction prefetch buffers 250 and 251 constituting an instruction prefetch queue are provided between the instruction register 25 and the internal data bus IDB and the data held by the instruction prefetch buffers 250 and 251 is selected by a selector 252 and supplied to the register 25. Each of the instruction prefetch buffers 250 and 251 and the instruction register 25 holds data every 32 bits and the holding operation is controlled by control signals $\phi 1$ to $\phi 3$ (synchronizing with CLK1).

Though not illustrated, each of the instruction prefetch buffers 250 and 251 and the instruction register 25 has a master-slave structure. The master stage latches an input synchronously with the rise of a corresponding control signal and the slave stage latches an input synchronously with the trailing edge of a corresponding control signal. Thereby, instruction data before and after prefetched is stored in the two-stage series instruction prefetch buffers 250 and 251.

The selector 252 selects 32-bit instruction data to be supplied to a port Pa or 32-bit instruction data to be supplied to a port Pb in accordance with a selection control signal $\phi 4$ and supplies it to the instruction register 25. The 32-bit instruction data using a high-order 16-bit area UPB1 of the instruction prefetch buffer 250 as a low-order side and a low-order 16-bit area LPB2 of the instruction prefetch buffer 251 as a high-order side is supplied to the port Pa. The 32-bit instruction data stored in the instruction prefetch buffer 251 is directly supplied to the port Pb.

Thereby, when the instruction prefetch buffer 251 holds a 32-bit DSP instruction, the selector 252 can set the 32-bit DSP instruction to the instruction register 25 by selecting an output of the port Pb.

When the instruction prefetch buffer 251 holds a 16-bit DSP instruction or a 16-bit CPU instruction in the high-order area UPB2, the selector 252 can set the 16-bit instruction to the high-order area UIR of the instruction register 25 by selecting an output of the port Pb.

When the instruction prefetch buffer 251 holds a 16-bit DSP instruction or a 16-bit CPU instruction in the low-order area LPB2, the selector 252 can set the 16-bit instruction to the high-order area UIR of the instruction register 25 by selecting an output of the port Pa.

When the instruction prefetch buffer 251 holds a high-order 16-bit instruction code of a 32-bit DSP instruction in the low-order area LPB2 and the instruction prefetch buffer 250 holds a low-order 16-bit instruction code of the 32-bit DSP instruction in the high-order area UPB1, the selector 252 can set the 32-bit DSP instruction to the instruction register 25 by selecting an output of the port Pa.

In FIG. 17, symbol 253 represents a control logic for generating latch control signals $\phi1$ and $\phi2$ of the instruction prefetch buffers, a latch control signal $\phi3$ of the instruction register 25, and the selection control signal $\phi4$. The control logic 253 generates the control signal 248 showing a 16-bit instruction or a 32-bit instruction and the control signals $\phi1$ to $\phi4$ in accordance with the state of an instruction code remaining unexecuted in each area of the instruction prefetch buffers 250 and 251. The control logic 253 constitutes a part of control logic for instruction fetch. The control signal 248 is generated when the first decode circuit 240 decodes 6 high-order bits of instruction code data supplied from the high-order area UIR of the instruction register 25 and its detail is described later.

Instruction code data is set to the instruction register 25 by the control logic 253 as shown below.

Instruction fetch from the outside is performed at the instruction fetch timing of the CPU core 2 (for example, at an instruction fetch stage IF of a plurality of pipeline stages to be mentioned later) when the instruction prefetch buffer 250 has a space for newly storing 32-bit instruction code data. When instruction fetch is performed at the timing, unexecuted instructions are left in the instruction prefetch buffer 251.

When both instruction codes stored in the areas UPB2 and LPB2 of the instruction prefetch buffer 251 are under the first state in which the codes are not executed yet, a 32-bit output of the instruction prefetch buffer 251 is selected by the selector 252 through the port Pb and set to the instruction register 25.

When the instruction code stored in the low-order area LPB2 of the instruction prefetch buffer 251 is under the second state in which the code is not executed yet, instruction code data in the high-order area UPB1 prefetched by the instruction prefetch buffer 250 and instruction code data in the low-order area LPB2 of the instruction prefetch buffer 251 are set to the instruction register 25 through the port Pa.

Under the above first state, when the decode circuit 240 decodes the instruction code data set to the high-order area UIR of the instruction register 25 and resultingly, the data is a 32-bit instruction, 32-bit instruction code data is directly transferred to the instruction prefetch buffer 251. However, when a 16-bit instruction is detected as the result of decoding the instruction decode data, no data is shifted from the instruction prefetch buffer 250 to the next-stage buffer 251.

Under the above second stage, the 32-bit instruction code data prefetched by the instruction prefetch buffer 250 is directly shifted to the instruction prefetch buffer 251 and set after data is set to the instruction register 25 through the port Pa. After the data is shifted and set, instruction code data is prefetched by the instruction prefetch buffer 250 at the next instruction prefetch timing unless any unexecuted instruction code data is left in the instruction prefetch buffer 250.

According to the above control, unprocessed instruction code data is set to the instruction register 25 after the instruction fetch timing. In this case, even if an instruction to be executed is any one of a 16-bit CPU instruction, 16-bit DSP instruction, and 32-bit DSP instruction, 16 high-order bits of the instruction is supplied to the first decode circuit 240 without fail.

The code conversion circuit 242 described in FIG. 6 comprises a selector 242A and a code conversion logic 242B in FIG. 17. Moreover, the first decode circuit 240, in the description of FIG. 6, generates the control signals 245 and 246 whose levels are controlled depending on whether the instruction code decoded by the circuit 240 is a 16-bit instruction or not. However, the embodiment in FIG. 17 outputs the control signal 248 for discriminating whether an instruction code decoded by the circuit 240 is a 16-bit instruction or a 32-bit instruction (in this embodiment, a 32-bit instruction is a DSP instruction). The selector 242A selects a no-operation code NOP and supplies it to the code conversion logic 242B when the control signal 248 represents a 16-bit instruction but it supplies an instruction code in the low-order area LIR of the instruction register 25 to the code conversion logic 242B when the control signal 248 represents a 32-bit DSP instruction. The code conversion logic 242B, though not restricted, corrects part of instruction code data of the low-order area LIR of the instruction register 25, for example, code information for selecting a register into a form suitable for the decoder 34 of the DSP engine 3 and then outputs it.

In the case of the embodiment in FIG. 17, the first decode circuit 240 decodes the 16-bit instruction code data held by the high-order area UIR of the instruction register 25 and supplies the CPU decode signal 243 obtained through the decoding to the second decode circuit 243 and moreover, supplies the DSP decode signal 244 to the decoder 34. The CPU decode signal 243 is made significant for any one of a CPU instruction and a DSP instruction and supplied to the second decode circuit 241. The second decode circuit 241 decodes the CPU decode signal 243 and outputs control information for address computation or data processing to be performed by the CPU core 2 or selection control information of an address bus or data bus for accessing the internal memory X-ROM 4, Y-ROM 5, X-RAM, Y-RAM, and an external memory. As described above, the CPU core 2 selects address arithmetic or a data path necessary for a DSP instruction.

The DSP decode signal 244, as described above, is a decode signal to be made significant when an instruction code to be supplied to the first decode circuit 240 is code data for a DSP instruction. The significant DSP decode signal 244 includes information for designating a register or the like in the DSP engine 3 for transfer data to and from a memory to be accessed in accordance with the address computation performed by the CPU core 2. When the instruction code to be supplied to the first decode circuit 240 is a CPU instruction, the DSP signal 244 is converted into a code representing invalidness.

The code of the DSP instruction included in the instruction set of the microcomputer 1 is described below more minutely. FIGS. 18 and 19 show the instruction code of a 16-bit DSP instruction respectively. FIGS. 20 and 21 show the instruction code of a 32-bit DSP instruction respectively. As described above, in the case of a DSP instruction, 4 high-order bits of the instruction code are assigned to "1111". In the case of a 16-bit DSP instruction, 6 high-order bits of the instruction code are assigned to "111100" and "111101". In the case of a 32-bit DSP instruction, 6 high-order bits of the instruction code are assigned to "111110".

The instruction format of the 16-bit DSP instruction shown in the first space (X Side of Data Transfer) in FIG. 18 represents a data transfer instruction used between an X memory (X-ROM 4 or X-RAM 6) and a built-in register of the DSP engine 3 and the instruction format shown in the second space (Y Side of Data Transfer) represents a data transfer instruction used between a Y memory (Y-ROM 5 or Y-RAM 7) and a built-in register of the DSP engine 3. In the above formats, Ax and Ay designate a register included in the register array 209 (see FIG. 3) in the CPU core 2, Ax="0" designates a register R4, Ax="1" designates a register R5, Ay="0" designates a register R6, and Ay="1" designates a register R7. Dx, Dy, and Da respectively designate a register included in the DSP engine, Dx="0" designates a register C0, Dx="1" designates a register X1, Dy="0" designates a register Y0, Dy="1" designates a register Y1, Da="0" designates a register A0, and Da="1" designates a register A1. Ix and Iy represent an immediate value respectively.

The instruction format of a 16-bit DSP instruction shown in FIG. 19 represents a data transfer instruction used between a memory (not shown) connected to an external unit of the microcomputer 1 and a built-in register of the DSP engine 3. As designates a register included in the register array 209 (see FIG. 3) built-in the CPU core 2. As designates a register included in the register X1, X0, Y1, Y0, A1, or A0, or a register array 305 (see FIG. 4).

The format of a 32-bit DSP instruction is roughly divided into an area (bit 31 to bit 26) of the code "111110" showing a 32-bit DSP instruction, field A (bit 25 to bit 16), and field B (bit 15 to bit 0). FIG. 20 shows codes in field A and mnemonics corresponding to field A when noticing field A and FIG. 21 shows codes in field B and mnemonics corresponding to field B when noticing field B.

The codes in field A shown in FIG. 20 are the same as those of bit 9 to bit 0 of the 16-bit DSP instruction shown in FIG. 18. The codes in field A shown in the first space (X Side of Data Transfer) in FIG. 20 specify the data transfer between an X memory (X-ROM 4 or X-RAM 6) and a built-in register of the DSP engine 3 and the codes in field A shown in the second space (Y Side of Data Transfer) specify the data transfer between a Y memory (Y-ROM 5 or Y-RAM 7) and a built-in register of the DSP engine 3. The contents designated by the bits Ax, Ay, Dx, Dy, and Da included in field A are the same as those in FIG. 18.

The codes in field B shown in FIG. 21 specify arithmetic operation, logical operation, shift operation, and processing such as load/store between registers. For example, the codes specify the operations such as multiplication (PMULS), subtraction (PSUB), addition (PADD), round (PRND), shift (PSHL), logical multiply (PAND), exclusive OR (XOR), logical add, increment (PINC), decrement (PDEC), and clear (CLR) performed in the DSP engine 3 or load (PLDS) and store (PSTS) performed in the DSP engine 3. The third space (3 Operand Operation with Condition) in FIG. 21 shows conditional codes and it is possible to select a logical value or disregard of a DC (data complete) bit (bit showing completion of data processing) as their conditions (if cc).

An actual 32-bit DSP instruction is described by optional combination of the codes in field B with those in field A. That is, the 32-bit DSP instruction fetches an operand to be operated from an internal or external unit of the microcomputer 1 and specifies the processing for operating the operand in the DSP engine 3. As described above, address computation or selection of a data path for operand fetch is performed by the CPU 2. The code in field A for specifying operand fetch in the 32-bit DSP instruction is the same as that of a 16-bit DSP instruction. The 16-bit DSP instruction is used for initialization of a register in the DSP engine 3.

As understood by referring to the structure shown in FIG. 17 or the like, code data in field A of a 32-bit DSP instruction is set to-the high-order area UIR of the instruction register 25. Moreover, a 16-bit DSP instruction having the same format as that of field A is set to the high-order area UIR. Therefore, in any case, it is enough for the CPU core 2 to perform necessary address computation and selection of a data path necessary for data fetch (or operand fetch) similarly. In other words, the decode circuits 240 and 241 required for data fetch (or operand fetch) to execute a 32-bit DSP instruction and data fetch (or operand fetch) to execute a 16-bit DSP instruction are used in common. Therefore, this also contributes to reduction of the logical scale of the microcomputer 1. Information for designating an internal register of the DSP engine 3 designated by field A of a 32-bit DSP instruction or information for designating an internal register of the DSP engine 3 designated by a 16-bit DSP instruction is supplied to the DSP engine 3 as the DSP decode signal 244. Whether to make the DSP decode signal 244 significant or not is decided when the first decode circuit 240 decodes 4 high-order bits of the high-order area UIR.

Then, details of the operation control in the microcomputer 1 of this embodiment are described below by referring the instruction execution timing charts in FIGS. 7 to 16.

The microcomputer 1 of this embodiment performs five-stage pipeline operations of IF, ID, EX, MA, and WB/DSP stages. IF represents an instruction fetch stage, ID represents an instruction decode stage, EX represents an operation execution stage, MA represents a memory access stage, and WB/DSP represents a stage for capturing data obtained from a memory into a register of the CPU core 2 or for the DSP engine 3 to execute a DSP instruction.

In each drawing, Instruction/Data Access represents memory access through the internal buses IAB and IDB and access objects include an external memory of the microcomputer 1 in addition to the built-in memories 4 to 7. X,Y Mem. Access represents memory access through the internal buses XAB and XDB or YAB and YDB but access objects are limited to the built-in memories 4 to 7. Isnt.Fetch represents the instruction fetch timing to the instruction register (IR) 25, Fetch. Reg. represents the instruction register (IR) 25, Source Data Out represents a source data output, Destination In represents the input timing of destination data, and Destination Register represents a destination register. Pointer Reg. represents a pointer register, Address Calc. represents address arithmetic; Data Fetch represents data fetch, and DSP Control signal Decode Timing represents the timing for decoding the DSP control signal 20 by the decoder 34.

Figure 7:
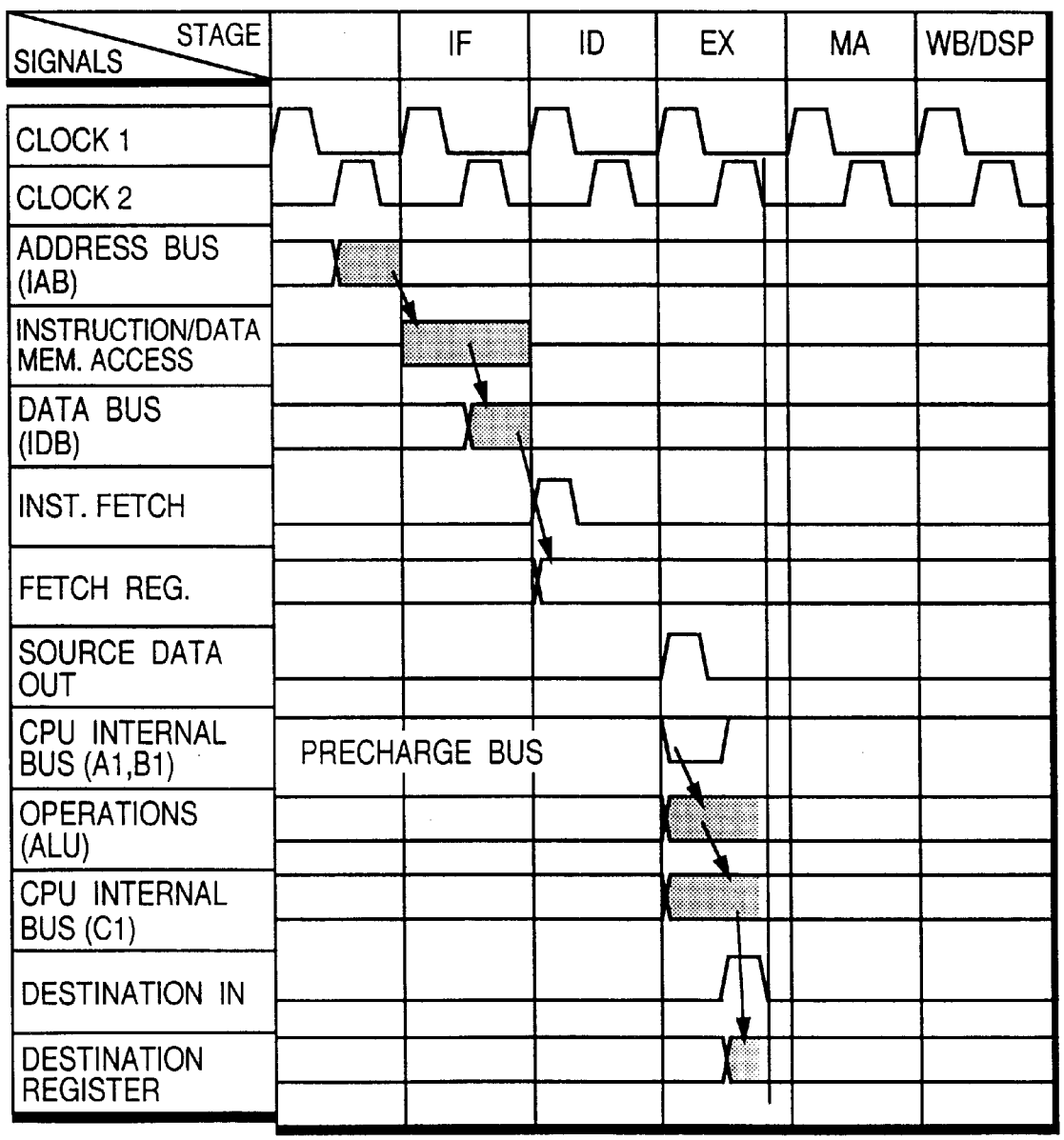
FIG. 7 is a time chart for executing an ALU arithmetic instruction in a CPU core.

FIG. 7 shows a time chart for executing an ALU arithmetic instruction in the CPU core 2. In this case, ADD Rm and Rn are used as ALU arithmetic instructions.

An address in which instructions to be executed (ADD Rm and Rn) is stored is output to the address bus IAB synchronously with the rise timing of the clock signal Clock 2 immediately before the IF stage. In the case of Instruction/ Data Mem. Access, memory access is performed at the IF stage. Specifically, an address designated by the address bus IAB is decoded in the period between the rise of the clock signal Clock 1 and the rise of the next clock signal Clock 2 and instruction access is performed in the period between the rise of the clock signal Clock 2 and the rise of the next clock signal Clock 1 at the IF stage. Therefore, an instruction is output to the data bus IDB from the time when the clock signal Clock 2 rises at the IF stage.

The instruction output to the data bus IDB is captured by the instruction register (IR) 25 synchronously with the rise timing of the clock signal Clock 1 at the ID stage. At the ID stage, data captured by the instruction register (IR) 25 is decoded.

A register in which source data is stored is accessed synchronously with the rise timing of the clock signal Clock 1 at the EX stage and a value in the register is output to the internal buses A1 and B1 of the CPU core 2. In the case of the instructions ADD Rm and Rn, registers designated to Rm and Rn are serve as source registers. Rm and Rn make it possible to designate any register in the CPU core 2 (in FIG. 3, any one of the registers A0x, A1x, Ix, A0y, A1y, and Iy in the register 209 can be designated as Rm or Rn).

Data output to the internal buses A1 and B1 of the CPU core 2 is added by the arithmetic and logic unit (ALU) 213 and is result is output to the internal bus C1 of the CPU core 2. The arithmetic result output to the internal bus C1 of the CPU core 2 is stored in a destination register (the designation register is a register designated to Rn in the instructions ADD Rm and Rn). Thus, instruction execution is completed at three pipeline stages of IF, ID, and EX by the ALU arithmetic instruction in the CPU core 2.

Figure 8:
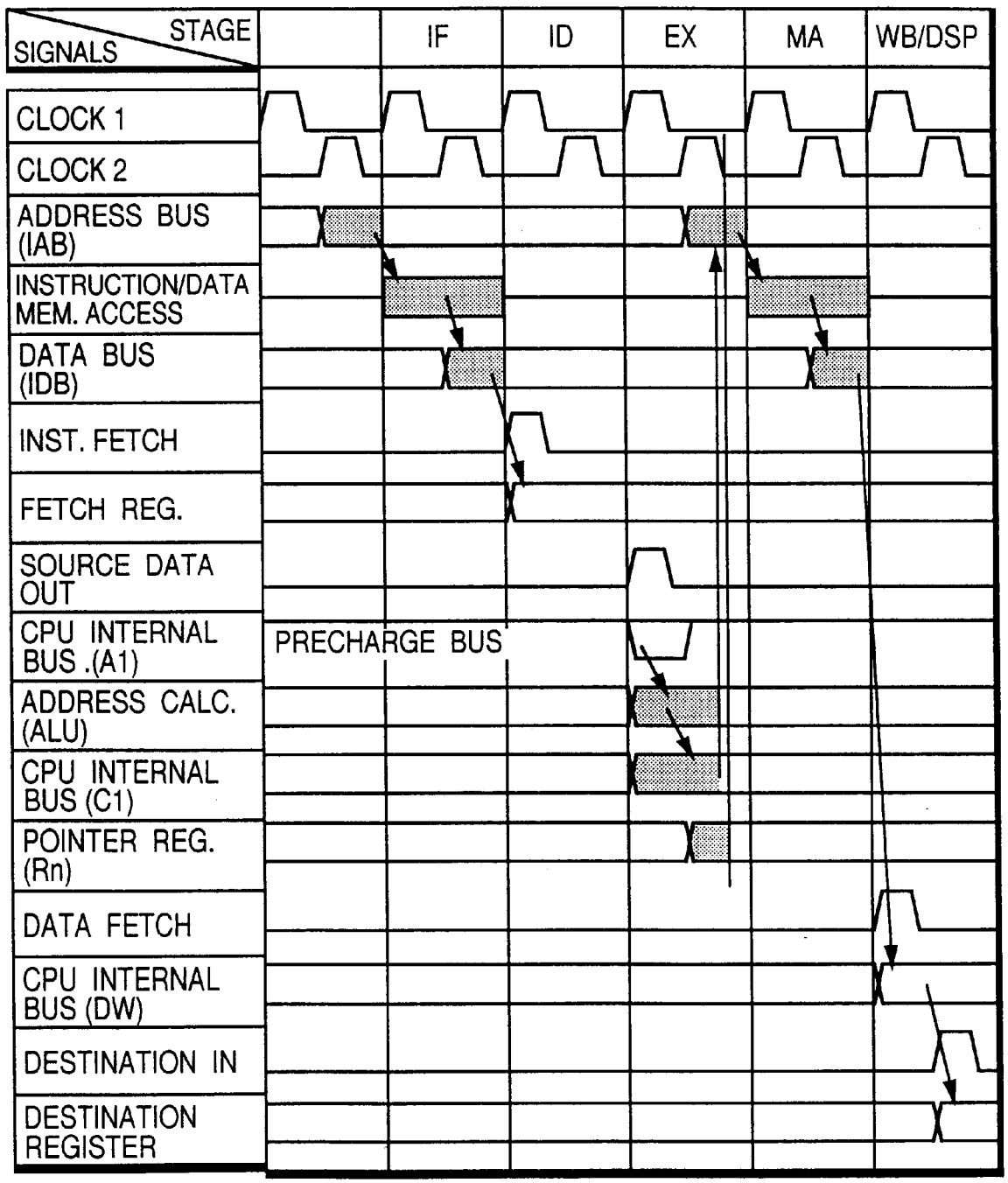
FIG. 8 is a time chart-for executing an instruction for reading data from a memory into a CPU core.

FIG. 8 shows a time chart for reading data from a memory to the CPU core 2.

Operations of an instruction for reading data from a memory to the CPU core 2 are described by taking MOV.L@Rm,Rn as an example of the instruction. Because operations up to instruction fetch (IF) and instruction decode (ID) are the same as those in FIG. 7, detailed description of them is omitted.

The data in a register serving as an address pointer synchronously with the rise timing of the clock signal Clock 1 at the EX stage is output to the internal bus A1 of the CPU core 2. In the case of this example, the register serving as an address pointer is a register designated with Rm. A register which can be designated to Rm is any register included in the CPU core 2 (in FIG. 3, any one of the registers A0x, A1x, Ix, A0y, A1y, and Iy can be designated as Rm). The data output to the internal bus A1 of the CPU core 2 is stored in the address buffer 205 and output to the address bus IAB synchronously with the rise timing of the clock signal Clock 2 at the EX stage.

The data output to the internal bus A1 of the CPU core 2 is computed by the arithmetic and logic unit (ALU) 213. In this case, the-arithmetic and logic unit (ALU) 213 performs zero addition arithmetic. The arithmetic result is output to the internal bus C1 of the CPU core 2. The arithmetic result output to the internal bus C1 of the CPU core 2 is stored in a pointer register (in this case, a register designated with Rm) synchronously with the rise timing of the clock signal Clock 2 at the EX stage.

In the case of Instruction/Data Mem. Access, an address output to the address bus IAB is decoded synchronously with the rise timing of the clock signal Clock 2 at the EX stage in the period between the rise of the clock signal Clock 1 and the rise of the clock signal Clock 2 at the MA stage and data access is performed in the period between the rise of the clock signal Clock 2 and the rise of the next clock signal Clock 1 at the MA stage. Therefore, data is output to the data bus IDB from the time when the clock signal Clock 2 rises at the MA stage.

The data output to the data bus IDB is captured by the CPU core 2 synchronously with the rise timing of the clock signal Clock 1 at the WP/DSP stage and output to the internal bus DW of the CPU core 2. The data on the internal bus DW of the CPU core 2 is stored in a destination register synchronously with the rise timing of the clock signal Clock 2 at the WB/DSP stage and operations are terminated.

In the case of this example, the destination register is a register designated to Rn. A register which can be designated to Rn is any register included in the CPU core 2 (in FIG. 3, any one of the registers A0x, A1x, Ix, A0Y, A1y, and Iy can be designated as Rn). As described above, instruction execution is completed at five pipeline stages of IF, ID, EX, MA, and WB/DSP by an instruction for reading data from a memory to the CPU core 2.

Figure 9:
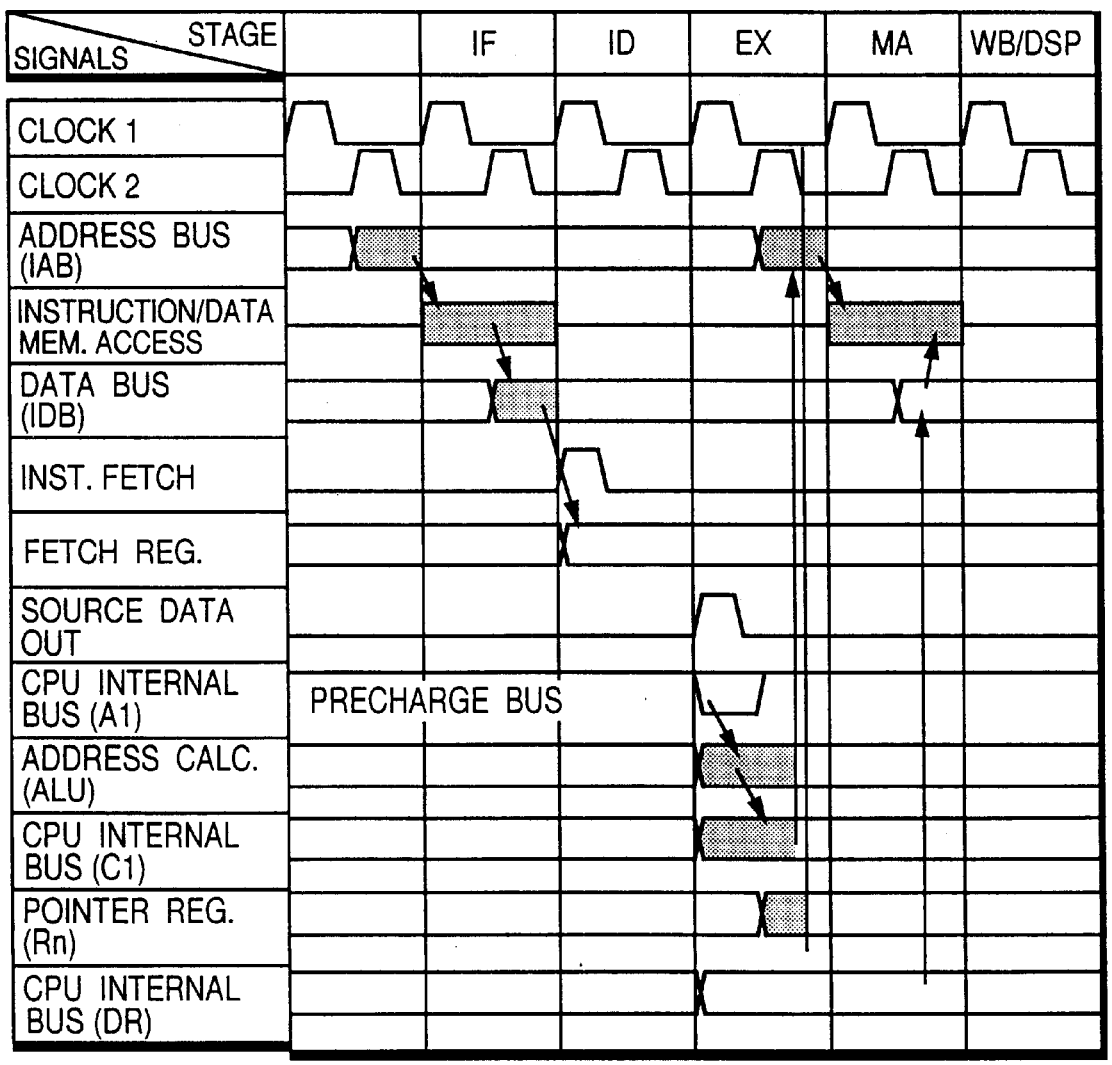
FIG. 9 is a time chart for executing an instruction for writing data from a CPU core into a memory.

FIG. 9 shows a time chart of an instruction for writing data in a memory from the CPU core 2.

Operations of the instruction are described by taking MOV.L Rm, @Rn as an example of the instruction for writing data from the CPU core 2 into a memory. Operations of the instruction fetch (IF) and instruction decode (ID) are the same as those in FIG. 8, detailed description of them is omitted.

The data in a register serving as an address pointer is output to the internal bus A1 of the CPU core 2 synchronously with the rise timing of the clock signal Clock 1 at the EX stage. In the case of this example, the register serving as an address pointer serves as a register designated with Rn. A register which can be designated to Rn is any register included in the CPU core 2 (in FIG. 3, any one of the registers A0x, A1x, Ix, A0y, A1y, and Iy in Reg. can be designated as Rn). The data output to the internal bus A1 of the CPU core 2 is stored in the address buffer 205 and output to the address bus IAB synchronously with the rise timing of the clock signal Clock 2 at the EX stage.

The data output to the internal bus A1 of the CPU core 2 is computed by the arithmetic and logic unit (ALU) 213. In this case, the arithmetic and logic unit (ALU) 213 performs zero addition arithmetic. The arithmetic result is output to the internal bus C1 of the CPU core 2. The arithmetic result output to the internal bus C1 of the CPU core 2 is stored in a pointer register (in this case, a register designated with Rn) synchronously with the rise timing of the clock signal Clock 2 at the EX stage.

In the case of the instruction MOV.L Rm, @Rn, address computation is performed at the EX stage and at the same time, it is prepared to output the data to be written in a memory to the data bus IDB. A value is output to the internal bus DR of the CPU core 2 from a register storing the data to be written in the memory synchronously with the rise timing of the clock signal Clock 1 at the EX stage. In the case of this example, the register storing the data to be written in the memory is a register designated with Rm. A register which can be designated with Rm is any register included in the CPU core 2 (in FIG. 3, any one of the registers A0x, A1x, Ix, A0y, A1y, and Iy in Reg. can be designated as Rm). The value output to the internal bus DR of the CPU core 2 is output to the data bus IDB synchronously with the rise timing of the clock signal Clock 2 at the MA stage.

In the case of Instruction/Data Mem. Access, an address output to the address bus IAB is decoded synchronously with the rise timing of the clock signal Clock 2 at the EX stage in the period between the rise of the clock signal Clock 1 and the rise of the clock signal Clock 2 at the MA stage and the data output to the data bus IDB is written synchronously with the rise timing of the clock signal Clock.2 at the MA stage and operations are terminated.

In the case of the instruction for writing data from a memory into the CPU core 2, the CPU core 2 terminates operations when outputting data to the data bus IDB. Therefore, operations are completed at four pipeline stages of IF, ID, EX, and MA.

Figure 10:
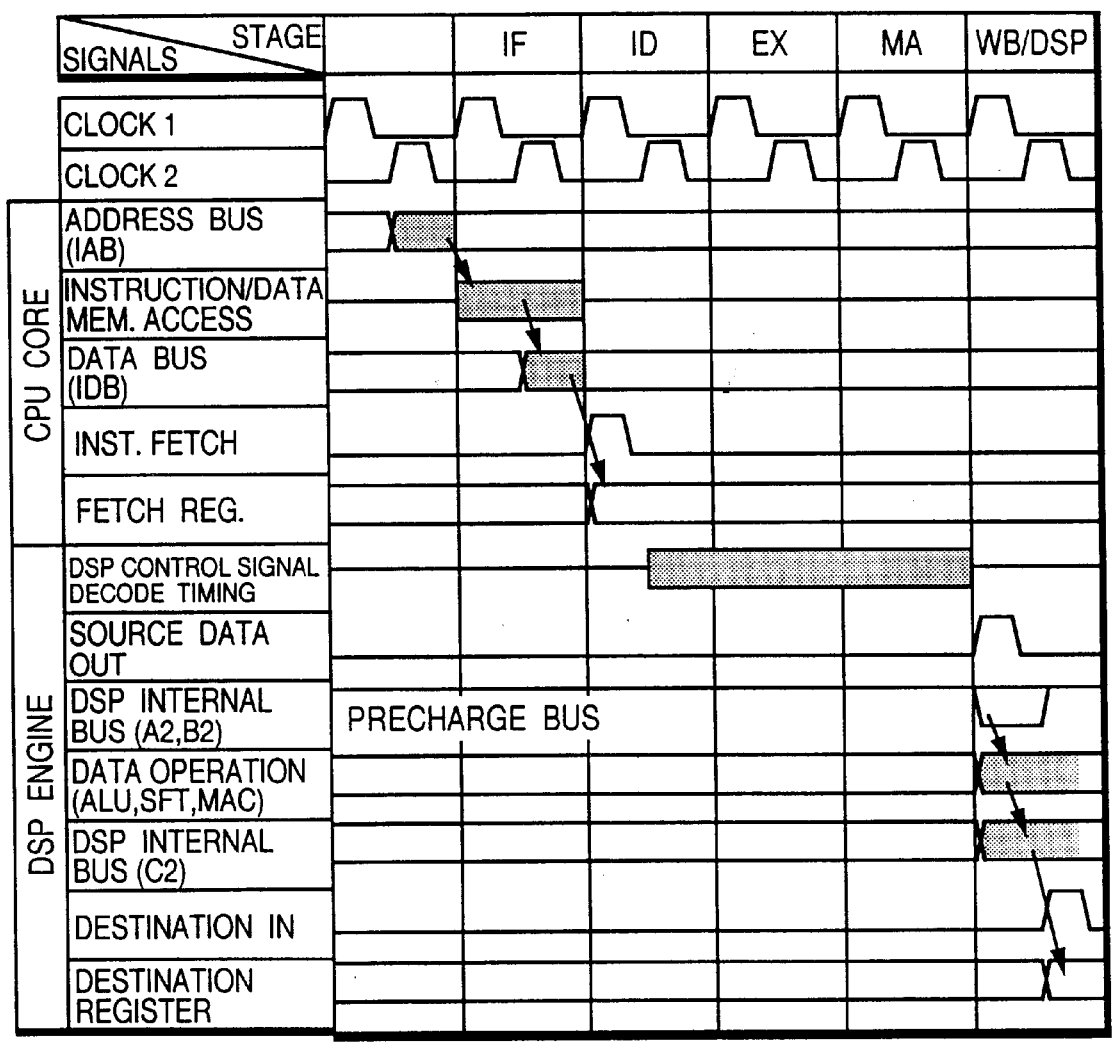
FIG. 10 is a time chart for executing a DSP instruction.

FIG. 10 shows a time chart for executing a DSP instruction. Operations of the instruction are described below by taking PADDC Sx, Sy, Dz NOPX NOPY as an example of the DSP instruction. This instruction adds the data stored in registers in the DSP engine 3 but it does not transfer data between the DSP engine 3 and the X-ROM 4 or X-RAM 6 or between the Y-ROM 5 and Y-RAM 7.

Because instruction fetch operation is the same as that in FIG. 7, its detailed description is omitted.

At the ID stage, an instruction code captured by the CPU core 2 is decoded in the period between the clock signal Clock 1 and the clock signal Clock 2 and the result of decoding the instruction code at the timing of the clock signal Clock 2 at the ID stage is output to the DSP engine 3 as the DSP control signal 20.

When the DSP engine 3 receives the DSP control signal 20 from the CPU core 2, it decodes the DSP control signal 20 received up to the period of the MA stage. A register storing source data is accessed synchronously with the rise timing of the clock signal Clock 1 at the WB/DSP stage and the value in the register is output to the internal buses A2 and B2.

In the case of this example, registers storing source data are registers designated with Sx and Sy. Registers which can be designated with Sx and Sy are any registers in the DSP engine 3 (in FIG. 4, any registers in Reg. can be designated as Sx and Sy). The data output to the internal buses A2 and B2 of the DSP engine 3 is computed by the arithmetic and logic unit (ALU) 302 and the result is output to the internal bus C2 of the DSP engine 3. The arithmetic result output to the internal bus C2 of the DSP engine 3 is stored in a destination register synchronously with the rise timing of the clock signal Clock 2 at the WB/DSP stage. In the case of this example, the destination register is a register designated with Dz. A register which can be designated to Dz is any register in the DSP engine 3 (in FIG. 4, any register in Reg.).

In the case of the above DSP instruction, operations are completed at five pipeline stages of IF, ID, EX, MA, and WB/DSP.

Figure 11:
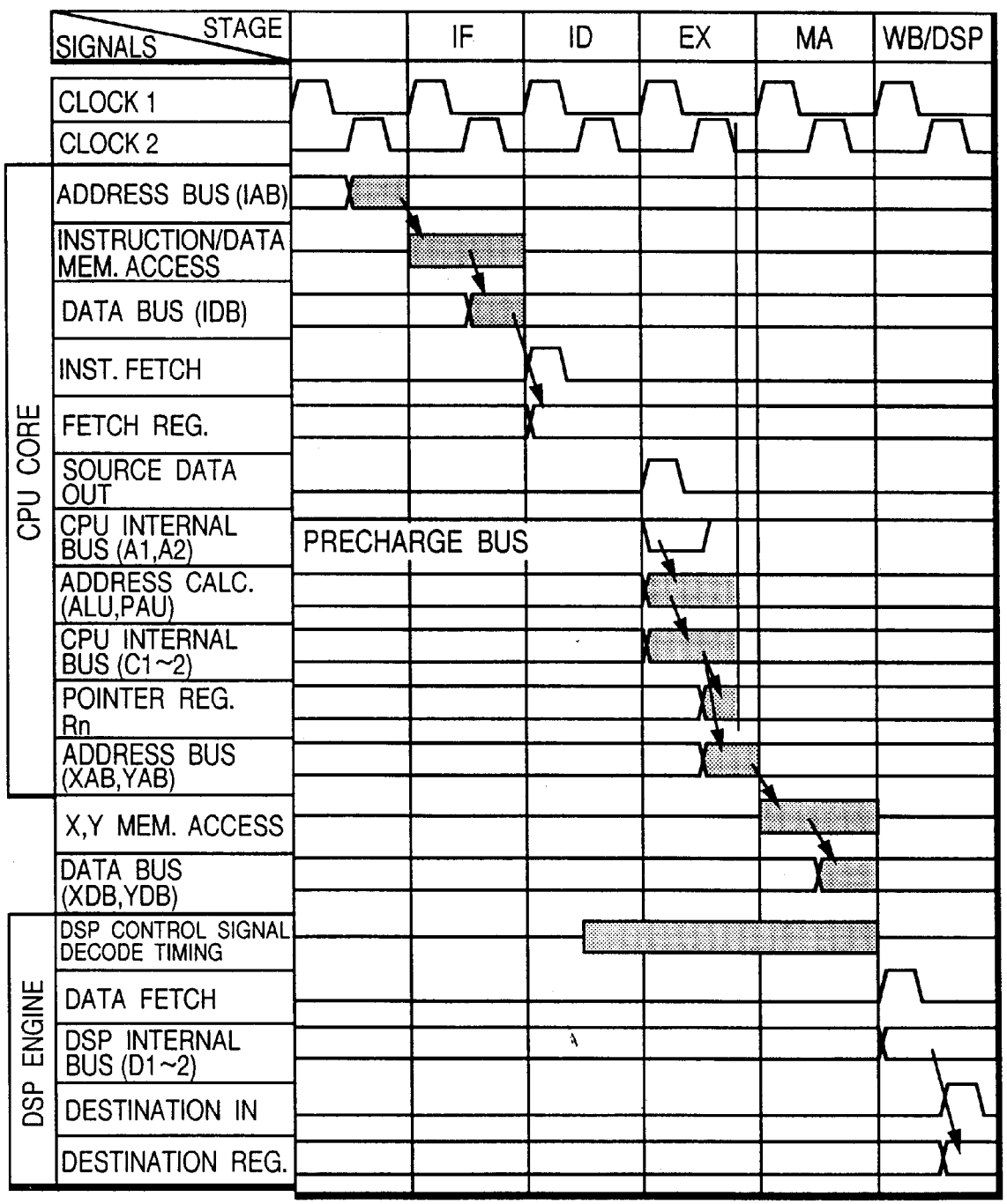
FIG. 11 is a time chart for executing an instruction for reading data from X and Y memories into a DSP engine.

FIG. 11 shows a time chart of an instruction for reading data from the X and Y memories 4 to 7 to the DSP engine 3. Operations of the instruction are described below by taking MOVX.W @Ax, Dx MOVY.W @Ay, Dy as an example of the instruction. This instruction transfers the data stored in addresses designated with Ax and Ay to registers designated with Dx and Dy. Because instruction fetching and instruction decoding are the same as those in FIG. 10, detailed description of them is omitted.

When executing an instruction for reading data from the X and Y memories 4 to 7 to the DSP engine 3, the CPU core 2 generates the address of a memory to be accessed. Therefore, a register storing the address to be accessed is accessed synchronously with the rise timing of the clock signal Clock 1 at the EX stage and Values in the register are output to the internal buses A1 and A2 of the CPU core 2.

In the case of this example, a register storing an address to be accessed is a register designated with Ax or Ay. A register which can be designated to Ax is a register A0x or A1x included in the CPU core 2 and a register which can be designated to Ax is a register A0y or A1y included in the CPU core 2. The data output to the internal buses A1 and A2 of the CPU core 2 is stored in the memory address buffers (MABX and MABY) and output to the address buses XAB and YAB synchronously with the rise timing of the clock signal Clock 2 at the EX stage.

The ALU 213 and PAU 212 apply address computation to the data output to the internal buses Al and A2 of the CPU core 2. In this case; the ALU 213 and PAU 212 perform zero addition arithmetic. The arithmetic results are output to the internal buses C1 and C2 of the CPU core 2. The arithmetic results output to the internal buses C1 and C2 of the CPU core 2 are stored in pointer registers (in this case, registers designated with Ax and Ay) synchronously with the rise timing of the clock signal Clock 2 at the EX stage.

In the X and Y memories 4 to 7, the addresses output to the address buses XAB and YAB are decoded at the rise timing of the EX-stage clock signal Clock 2 in the period between the rise of the clock signal Clock 1 and the rise of the clock signal Clock 2 at the MA stage and data is accessed in the period between the rise of the clock signal Clock 2 and the rise of the next clock signal Clock 1 at the MA stage. Therefore, data is output to the data buses XDB and YDB from the time when the clock signal Clock 2 rises at the MA stage.

The data output to the data buses XDB and YDB is captured by the DSP engine 3 synchronously with the rise timing of the clock signal-Clock 1 at the WB/DSP stage and supplied to the internal buses D1 and D2 of the DSP engine 3. The data on the internal buses D1 and D2 of the DSP engine 3 is stored in destination registers synchronously with the rise timing of the clock signal Clock 2 at the WB/DSP stage and operations are terminated.

In the case of this example, the destination registers are registers designated to Dx and Dy. A register which can be designated to Dx is a register X0 or X1 included in the DSP engine 3 and a register which can be designated to Dy is a register Y0 or Y1 included in the DSP engine 3.

As described above, in the case of the instruction for reading data from a memory to the DSP engine 3, operations are completed at five pipeline stages of IF, ID, EX, MA, and WB/DSP. This parallel data read can be performed because the CPU core 2 can access the X and Y memories 4 to 7 through the buses XAB and XDB and the buses YAB and YDB which are independent each other.

Figure 12:
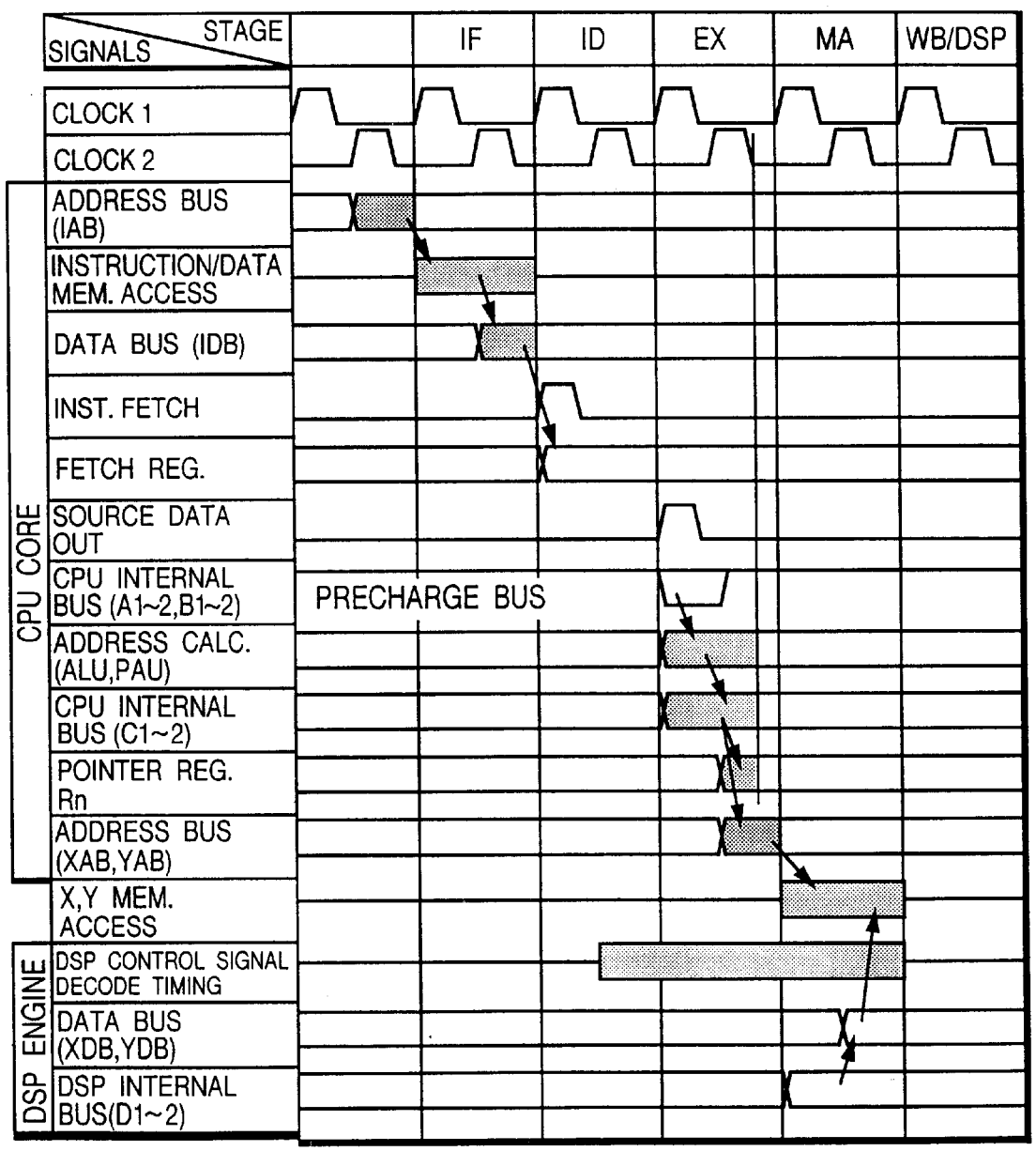
FIG. 12 is a time chart for executing an instruction for writing data from a DSP engine into X and Y memories.

FIG. 12 shows a time chart for writing data in the X and Y memories 6 and 7 from the DSP engine 3. Operations of an instruction for writing data in the X and Y memories 6 and 7 from the DSP engine 3 are described below by taking MOVX.W Da, @Ax MOVY.W Da, @AY as an example of the instruction. This instruction transfers data stored in a register designated with Da to addresses stored in registers designated with Ax and Ay.

Because instruction fetching and instruction decoding are the same as those in FIG. 11, detailed description of them is omitted.

When executing an instruction for writing data in the X and Y memories 6 and 7 from the DSP engine 3, the CPU core 2 generates a memory address to be accessed. Therefore, registers storing addresses to be accessed are accessed synchronously with the rise timing of the clock signal Clock 1 at the EX stage and values in the registers are output to the internal buses A1 and A2 of the CPU core 2. In the case of this example, the registers storing addresses to be accessed are registers designated with Ax and Ay. A register which can be designated to Ax is a register A0x or A1x included in the CPU core 2 and a register which can be designated to Ay is a register A0y or A1y included in the CPU core 2.

The data output to the internal buses A1 and A2 of the CPU core 2 is stored in the memory address buffers (MABX and MABY) and output to the address buses XAB and YAB synchronously with the rise timing of the clock signal Clock 2 at the EX stage.

An internal register of the DSP engine 3 storing data to be transferred is accessed synchronously with the rise timing of the clock signal Clock 1 at the MA stage and values in the register are output to the internal buses D1 and D2 of the DSP engine 3 and stored in the memory data buffers (MDBX and MDBY). In the case of this example, the internal register of the DSP engine 3 storing data to be transferred is a register designated with Da. Registers which can be designated with Da are registers A0 and A1 included in the DSP engine 3.

The data stored in the memory data buffers (MDBX and MDBY) is output to the data buses XDB and YDB synchronously with the rise timing of the clock signal Clock 2 at the MA stage. In the X and Y memories 6 and 7, addresses output to the address buses XAB and YAB are decoded at the rise timing of the EX-stage clock signal Clock 2 in the period between the rise of the clock signal Clock 1 and the rise of the clock signal Clock 2 at the MA stage and data is accessed in the period between the rise of the clock signal Clock 2 and the rise of the next clock signal Clock 1 at the MA stage. Therefore, the data output to the data buses XDB and YDB is written from the time when the clock signal Clock 2 rises at the MA stage.

As described above, in the case of the instruction for writing data in the X and Y memories 6 and 7 from the DSP engine 3, operations are completed at four pipeline stages of IF, ID, EX, and MA. This parallel data write can be performed because the CPU core 2 can access the X and Y memories 4 and 6 through the buses XAB and XDB and the buses TAB and YDB which are independent each other.

Figure 13:
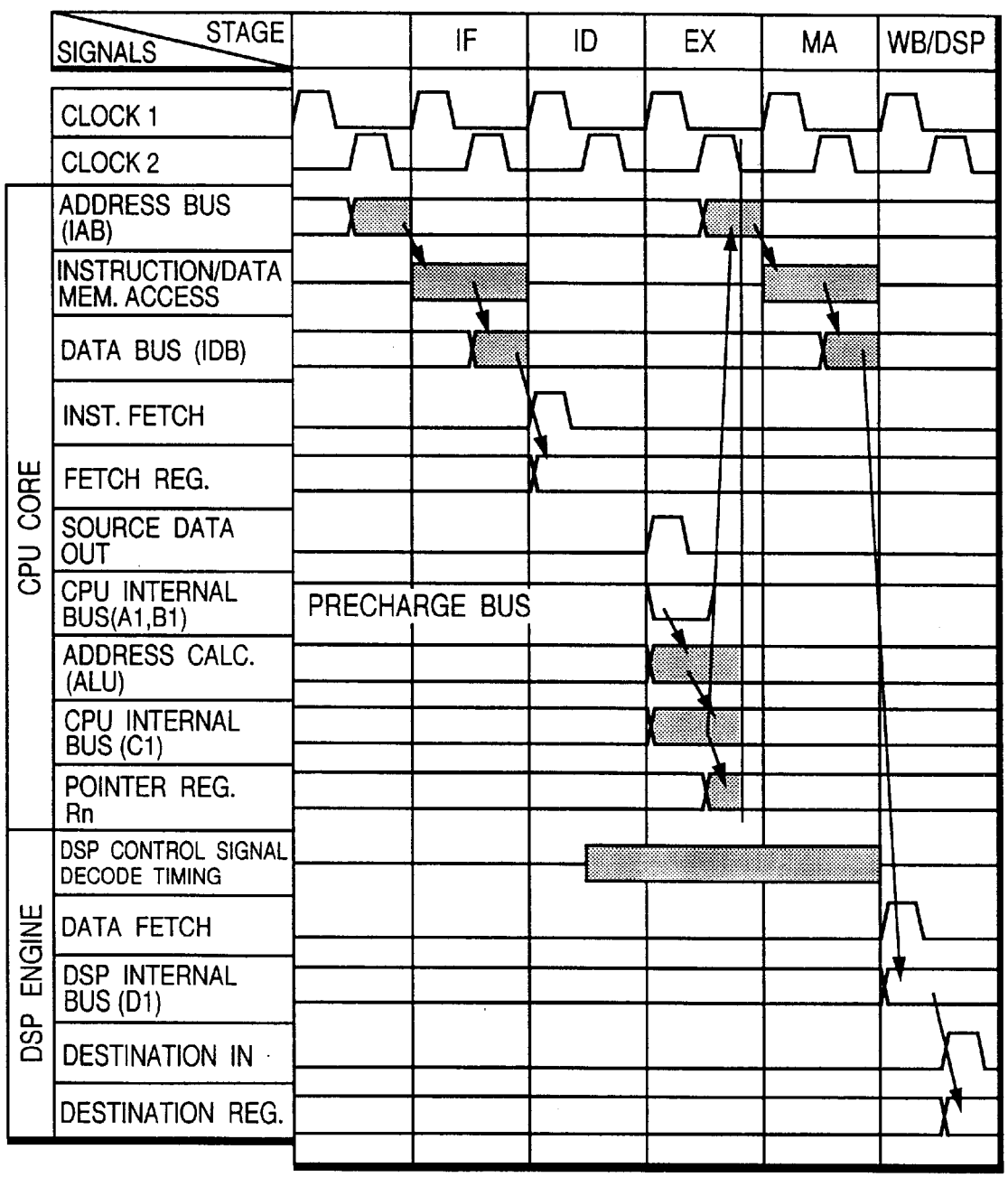
FIG. 13 is a time chart for executing an instruction for reading data from a memory into a DSP engine.

FIG. 13 shows a time chart for reading data from a memory to the DSP engine 3.

Operations of an instruction for reading data from a memory to the DSP engine 3 are described below by taking MOVS.L @As, Ds as an example of the instruction. This instruction transfers data stored in an address designated with As to a register designated with Ds.

The basic operation is the same as the data read from the X and Y memories 4 to 7 to the DSP engine 3 shown in FIG. 11. FIGS. 11 and 13 are different from each other in that the X and Y buses are used in FIG. 11 because purposed memories are the X and Y memories 4 to 7 but the buses IAB and IDB are used in FIG. 13 because the purposed memory is a memory connected to an address space supported by the microcomputer 1.

The register holding an address to be accessed is accessed synchronously with the rise timing of the clock signal Clock 1 at the EX stage and a value in the register is output to the internal bus Al of the CPU core 2. In the case of this example, the register storing an address to be accessed is a register designated with As. A register which can be designated with As is any register in Reg. included in the CPU core 2. The data output to the internal bus A1 of the CPU core 2 is stored in the address buffer 205 and output to the address bus IAB synchronously with the rise timing of the clock signal Clock 2 at the EX stage.

The arithmetic and logic unit (ALU) 213 applies address computation to the data output to the internal bus A1 of the CPU core 2. In this case, the arithmetic and logic unit (ALU) 213 performs zero addition arithmetic. The arithmetic result is output to the internal bus Cl of the CPD core 2.

The arithmetic result output to the internal bus C1 of the CPU core 2 is stored in a pointer register (in this case, a register designated with As) synchronously with the rise timing of the clock signal Clock 2 at the EX stage. In the memory to be accessed, the address output to the address bus IAB is decoded at the rise timing of the EX-stage clock signal Clock 2 in the period between the rise of the clock signal Clock 1 and the rise of the clock signal Clock 2 at the MA stage and data is accessed in the period between the rise of the clock signal Clock 2 and the rise of the next clock signal Clock 1 at the MA stage.

Therefore, data is output to the data bus IDB from the time when the clock signal Clock 2 rises at the MA stage. The data output to the data bus IDB is captured by the DSP engine 3 synchronously with the rise timing of the clock signal Clock 1 at the WB/DSP stage and supplied to the internal bus D1 of the DSP engine 3. The data on the internal bus D1 of the DSP engine 3 is stored in a destination register synchronously with the rise timing of the clock signal Clock 2 at the WB/DSP stage and operations are terminated.

In the case of this example, the designation register is a register designated with Ds. A register which can be designated to Ds is any register in the DSP engine 3. As described above, in the case of the instruction for writing data in the DSP engine 3 from a memory, operations are completed at five pipeline stages of IF, ID, EX, MA, and WB/DSP.

Figure 14:
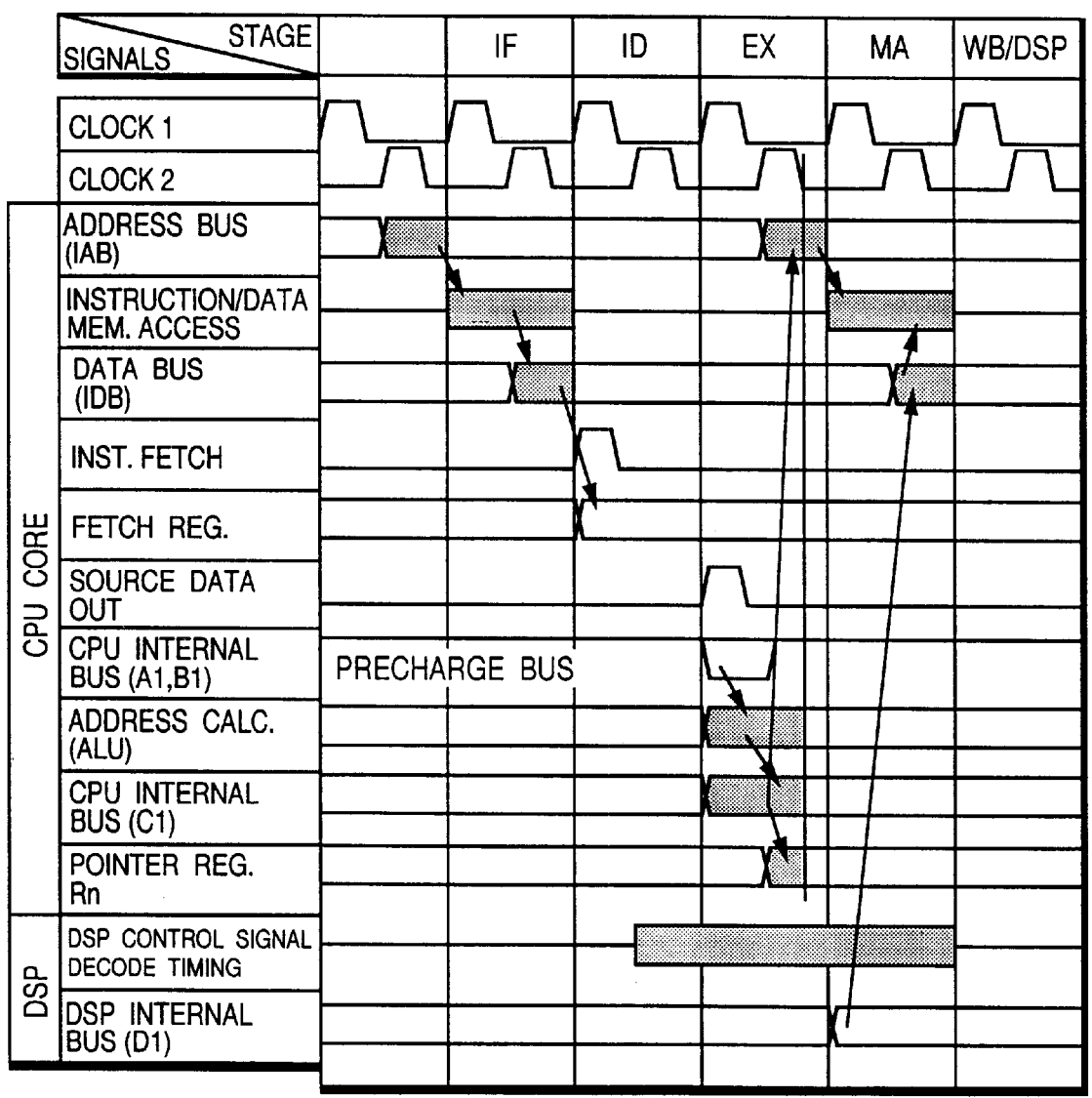
FIG. 14 is a time chart for executing an instruction for writing data from a DSP engine into a memory.

FIG. 14 shows a time chart for writing data in a memory from the DSP engine 3.

Operations of an instruction for writing data in a memory from the DSP engine 3 are described below by taking MOVS.L Ds, @As as an example of the instruction. This instruction transfers data stored in a register designated with Ds to an address designated with As.

The basic operation is the same as the data write in the X and Y memories from the DSP engine 3 shown in FIG. 12. FIGS. 12 and 14 are different from each other in that the buses XAB and XDB and the buses YAB and YDB are used in FIG. 12 because purposed memories are the X and Y memories but the buses IAB and IDB are used in FIG. 14 because the purpose memory is a memory connected to an address space supported by the microcomputer 1.

The register holding a transfer destination address is accessed synchronously with the rise timing of the clock signal Clock 1 at the EX stage and a value in the register is output to the internal bus A1 of the CPU core 2. In the case of this example, the register storing an address to be accessed is a register designated with As. A register which can be designated with As is any register in the register Reg. included in the CPU core 2. The data output to the internal bus A1 of the CPU core 2 is stored in the address buffer 205 and output to the address bus IAB synchronously with the rise timing of the clock signal Clock 2 at the EX stage.

The arithmetic and logic unit (ALU) 213 applies address computation to the data output to the internal bus A1 of the CPU core 2. In this case, the arithmetic and logic unit (ALU) 213 performs zero addition arithmetic. The arithmetic result is output to the internal bus C1 of the CPU core 2. The arithmetic result output to the bus C1 of the CPU core 2 is stored in a pointer register (in this case, a register designated with As) synchronously with the rise timing of the clock signal Clock 2 at the EX stage.

A value in the register in the DSP engine 3 storing the data to be transferred is output to the internal bus D1 of the DSP engine 3 synchronously with the rise timing of the clock signal Clock 1 at the MA stage and stored in the memory data buffer (MDBI). The data stored in the memory data buffer (MDBI) is output to the data bus IDB synchronously with the rise timing of the clock signal Clock 2 at the MA stage. In the case of this example, the register in the DSP engine 3 storing the data to be transferred is a register designated to Ds. A register which can be designated to Ds is any register in the DSP engine 3.

In the memory to be access, the address output to the address bus IAB is decoded at the rise timing of the EX-stage clock signal Clock 2 in the period between the rise of the clock signal Clock 1 and the rise of the clock signal Clock 2 at the MA stage and data is accessed in the period between the rise of the clock signal Clock 2 and the rise of the next clock signal Clock 1 at the MA stage. Therefore, the data output from the DSP engine 3 is written in the memory at the rise timing of the clock signal Clock 2 at the MA stage.

As described above, in the case of the instruction for writing data in an external memory from the DSP engine 3, operations are completed at four pipeline stages of IF, ID, EX, and MA.

Figure 15:
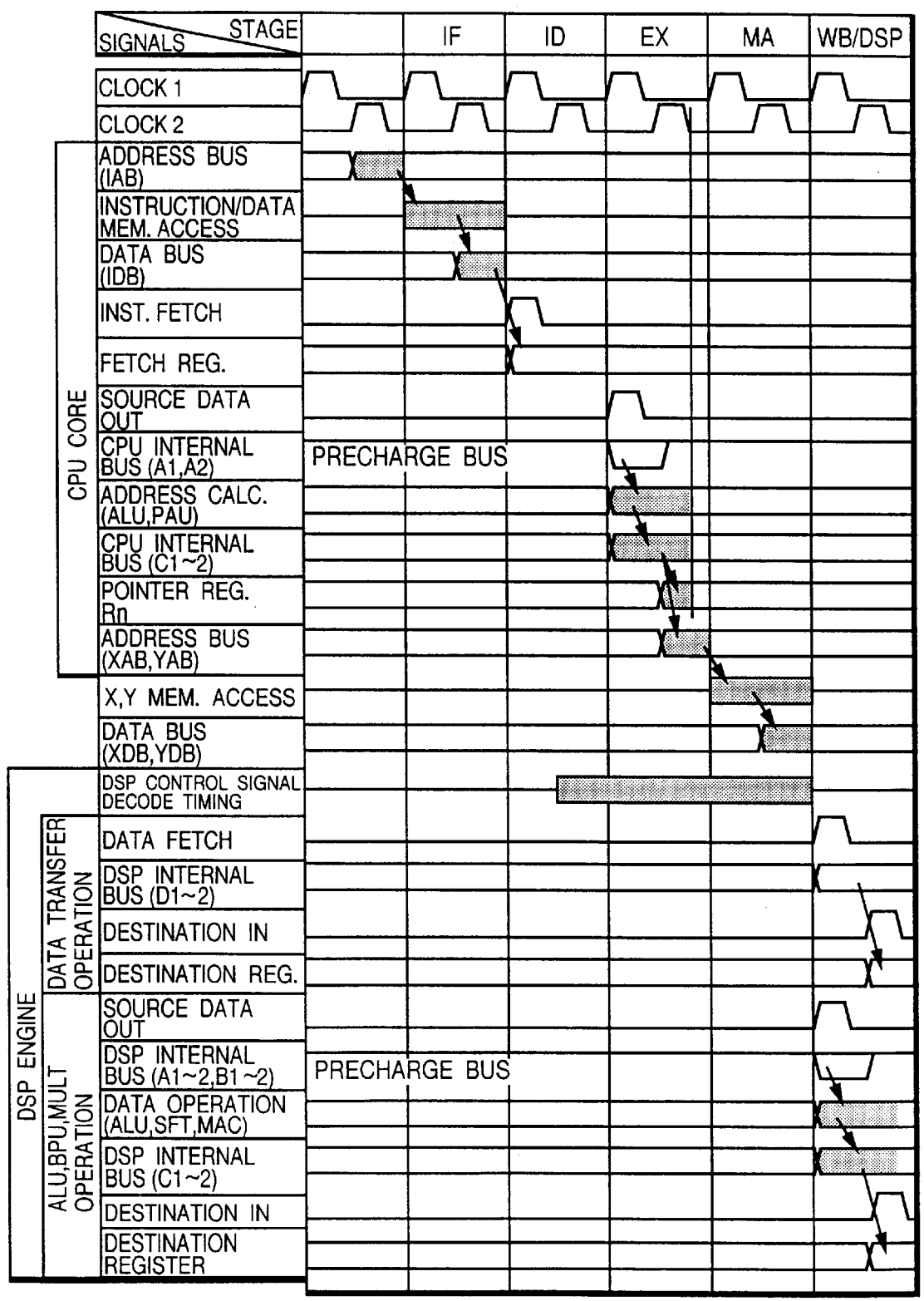
FIG. 15 is a time chart for executing a DSP arithmetic instruction.

Then, operations of a DSP arithmetic instruction are described below by taking PADD SK, Sy, Du PMUL Se, Sf, Dg MOVX.W @Ax, Dx MOVY.W @Ay, Dy as an example of the instruction and referring to FIG. 15. This instruction adds and multiplies the data stored in registers in the DSP engine 3 and transfers the data to the DSP engine 3 from the X-ROM 4 and X-RAM 6 or the Y-ROM 5 and Y-RAM 7. The operations of the instruction are obtained by combining the operations in FIG. 10 with those in FIG. 11. Because instruction fetching and instruction decoding are the same as those in FIG. 10, detailed description of them is omitted.

To execute an instruction for reading data from the X and Y memories to the DSP engine 3, the CPU core 2 generates the address of a memory to be accessed. Therefore, registers holding addresses to be accessed are accessed synchronously with the rise timing of the clock signal Clock 1 at the EX stage and values in the registers are output to the internal buses A1 and A2 of the CPU core 2.

In the case of this example, registers storing the addresses to be accessed are registers designated with Ax and Ay. A register which can be designated with Ax is a register A0x or A1x included in the CPU core 2 and a register which can be designated with Ay is a register A0Y or A1y included in the CPU core 2. The data output to the internal buses A1 and A2 of the CPU core 2 are stored in the memory address buffers (MABX and MABY) and output to the address buses XAB and YAB synchronously with the rise timing of the clock signal Clock 2 at the EX stage.

The ALU 213 and PAU 212 apply address computation to the data output to the internal buses A1 and A2 of the CPU (in this case, the ALU 213 and PAU 212 performs zero addition arithmetic) and the results are output to the internal buses C1 and C2 of the CPU core 2. The arithmetic results output to the internal buses C1 and C2 of the CPU core 2 are stored in pointer registers (in this case, registers designated with Ax and Ay) synchronously with the rise timing of the clock signal Clock 2 at the EX stage.

In the X and Y memories, the addresses output to the address buses XAB and YAB are decoded at the rise timing of the clock signal Clock 2 at the EX stage in the period between the rise of the clock signal Clock 1 and the rise of the clock signal Clock 2 at the MA stage and data is accessed in the period between the rise of the clock signal Clock 2 and the rise of the next clock signal Clock 1 at the MA stage. Therefore, data is output to the data buses XDB and YDB from the time when the clock signal Clock 2 rises at the MA stage.

The data output to the data buses XDB and YDB is captured by the DSP engine 3 at the rise timing of the clock signal Clock 1 at the WB/DSP stage and output to the internal buses D1 and D2 of the DSP engine 3. The data on the internal buses D1 and D2 of the DSP engine 3 is stored in destination registers (Destination Reg.) synchronously with the rise timing of the clock signal Clock 2 at the WB/DSP stage and operations are terminated.

In the case of this example, the destination registers are registers designated to Dx and Dy. A register which can be designated to Dx is X0 or X1 in the DSP engine 3 and a register which can be designated to Dy is Y0 or Y1 in the DSP engine 3.

DSP arithmetic operation is performed simultaneously with the above data transfer. The registers storing source data are accessed synchronously with the rise timing of the clock signal Clock 1 at the WB/DSP stage and values in the registers are output to the internal buses A1, A2, B1, and B2 of the DSP engine 3. In the case of this example, the registers storing source data are registers designated with Sx and Sy for ADD (addition) but registers designated with Se and Sf for MUL (multiplication). Registers designated with Sx, Sy, Se, and Sf are any registers in the DSP engine 3.

The data output to the internal buses A1 and B1 of the DSP engine 3 is multiplied by the MAC 304 and the result is output to the internal bus C1 of the DSP engine 3. The data output to the internal buses A2 and B2 of the DSP engine 3 is added by the ALU 302 and the result is output to the internal bus C2 of the DSP engine 3.

The arithmetic results output to the internal buses C1 and C2 of the DSP engine 3 are stored in a destination register synchronously with the rise timing of the clock signal Clock 2 at the WB/DSP stage. The destination register in this example is a register designated with Du for ADD operation and a register designated with Dg for MUL operation. Registers which can be designated to Du and Dg are any registers in the DSP engine 3.

As described above, in the case of the instruction for adding and multiplying data stored in registers in the DSP engine 3 and transferring the data to the DSP engine 3 from the X-ROM 4 and X-RAM 6 or the Y-ROM 5 and Y-RAM 7, operations are completed at five pipeline stages of IF, ID, EX, MA, and WB/DSP.

Figure 16:
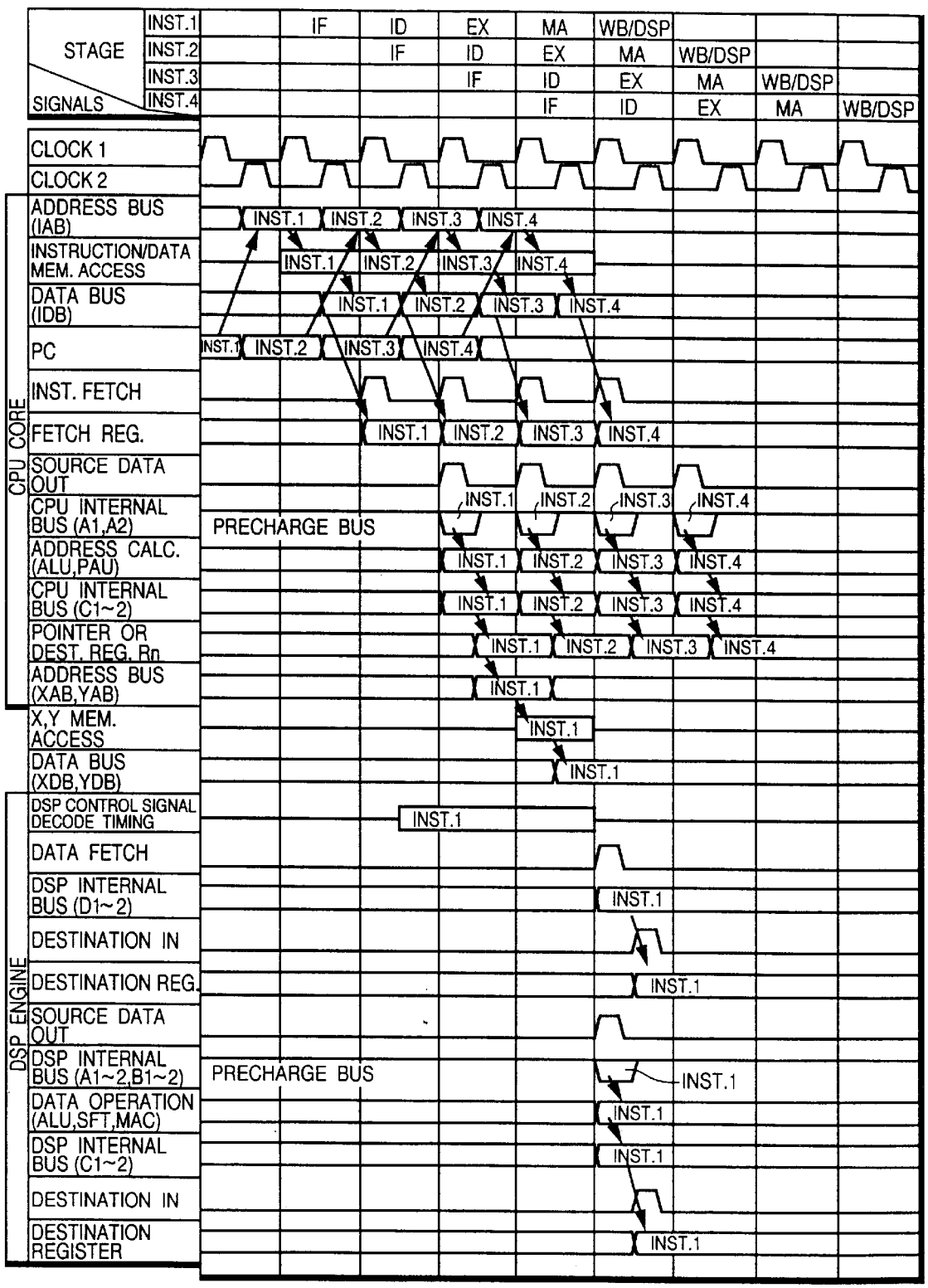
FIG. 16 is a time chart for continuously executing a DSP arithmetic instruction.

Operations of a DSP arithmetic instruction are described below by taking four consecutive instructions as the second example of the DSP instruction and referring to FIG. 16.

Inst 1: PADD A0, M0, A0 PMUL A1, X0, A1 MOVX.W @R4, X1 MOVY.W @R6, Y0

Inst 2: ADD R8, R9

Inst 3: ADD R10, R11

Inst 4: ADD R12, R13

These four instructions realize different operations in the same clock cycle by using the address buses IAB, XAB, and YAB at the same time. Because instruction operations from Inst 1 t Inst 4 are the same as those in FIGS. 7 and 15, detailed description of them is omitted.

First, instruction fetch of Inst 1 is performed at the IF stage of Inst 1. At the time of the ID stage of Inst 1, instruction fetch is performed because the IF stage is set for Inst 2.

While address computation for accessing the X and Y memories is performed at the EX stage of Inst 1, Inst 2 performs instruction decode for the ID stage and Inst 3 performs instruction fetch for the IF stage.

At the MA stage of Inst 1, addresses computed at the EX stage are output to the address buses XAB and YAB (the timing for actually outputting addresses starts with the rise timing of the clock signal Clock 2 at the EX stage) and data is captured through the data buses XDB and YDB. In this case, Inst 2 performs ADD arithmetic between R8 and R9 to complete operations because of the EX stage and Inst 3 performs instruction decode because of the ID stage. Moreover, Inst 4 outputs the address storing Inst 4 to the address bus IAB because of the IF stage. The timing for actually outputting the address to the address bus IAB starts with the rise timing of the clock signal Clock 2 half cycle before the IF stage of Inst 4. This timing is the same as the timing (second half of the EX stage and the first half of the MA stage) for Inst 1 to output addresses to the address buses XAB and YAB.

That is, the address buses XAB and YAB are used for data transfer and the address bus IAB is used for instruction fetch. Because the microcomputer 1 includes the internal address buses IAB, XAB, and YAB and the internal data buses IDB, XDB, and YDB respectively connected to the CPU core 2, it can execute different memory access operations in the same cycle by using the above three types of internal address buses and three types of internal data buses.

Thereafter, Inst 1 performs DSP arithmetic at the WB/DSP stage and completes operations, Inst 2 already completes operations, Inst 3 performs ADD arithmetic between R10 and R11 because of the EX stage and completes operations, and Inst 4 performs instruction decode because the ID stage.

In the next cycle, only the EX stage of Inst 4 is performed and ADD arithmetic between R12 and R23 is performed to complete operations.

This embodiment has the following functions and advantages.

A built-in memory is divided into Y memories 5 and 7 and X memories 4 and 6 by considering the multiply and accumulate operation by the DSP engine 3 and the CPU core 2 is made possible to access the Y memories 5 and 7 and the X memories 4 and 6 in parallel through the internal buses XAB and XDB and the internal buses YAB and YDB respectively.

Thereby, it is possible to simultaneously transfer two data values to the DSP engine 3 from the built-in memories 4 to 7. Moreover, because the internal buses XAB and XDB and the internal buses YAB and YDB are also separate from the internal buses IAB and IDB to be interfaced with the outside, the CPU core 2 is made possible to access an external memory in parallel with the access to the X memories 4 and 6 and the Y memories 5 and 7. Thus, because there are three types of address buses IAB, XAB, and YAB and three types of data buses IDB, XDB, and YDB respectively connected to the CPU core 2, it is possible to access different memories in the same clock cycle by using the three types of internal address buses and three types of internal data buses. Therefore, even when a program or data is present in an external memory, it is possible to easily correspond to it and accelerate the arithmetic processing.

It is possible to further improve the microcomputer operating easiness by constituting each of the X memories 4 and 6 and the Y memories 5 and 7 with a RAM and a ROM.

As described above, the built-in memory is divided into the following two types: the X memories 4 and 6 and the Y memories 5 and 7. Each of two types of the divided memories is provided with a ROM and a RAM, and a data memory can be separate from a program memory by using the RAM as the data memory and the ROM as the program memory. Moreover, it is possible to transfer two data values to the DSP engine 3 in parallel and efficiently perform instruction fetch, data transfer, and arithmetic by the parallel pipeline processing.

By providing the modulo address output portion 200 for the CPU core 2, it is possible to accelerate address generation for repetitive operation such as multiply and accumulate operation in the CPU core 2.

A CPU instruction is assigned to an address space in which 4 high-order bits of an instruction code are set to "0000" up to "1110". In the case of a DSP instruction, 4 high-order bits of an instruction code are all assigned to "1111". Moreover, an instruction in which 6 high-order bits of an instruction code are assigned to address spaces of "111100" and "111101" has a 16-bit instruction code even in the case of a DSP instruction. An instruction in which 6 high-order bits of an instruction code are set to "111110" has a 32-bit instruction code. No instruction is assigned to an address space in which 6 high-order bits of an instruction code are set to "111111" and the address space is a vacant area. Thus, by applying the above rule to assignment of codes to up to 32-bit instruction and decoding 6 high-order bits of an instruction code, it is possible to decide by a decoder with a small logical scale whether the instruction concerned is a CPU instruction, a 16-bit DSP instruction, or a 32-bit DSP instruction and therefor, it is unnecessary to always decode 32 bits at the same time.

As described above by referring to FIG. 17, unprocessed instruction code data is set to the instruction register 25 after the instruction fetch timing. In this case, even if an instruction to be executed is any one of a 16-bit CPU instruction, 16-bit DSP instruction, and 32-bit DSP instruction, it is possible to supply 16 high-order bits of the instruction to the first decode circuit 240 without fail.

A code in field A of a 32-bit DSP instruction is set to the high-order area UIR of the instruction register 25 and a 16-bit DSP instruction having the same format as field A is also set to the high-order area UIR. Therefore, in any case, the CPU core 2 can perform necessary address arithmetic and selection of a data path necessary for data fetch similarly. That is, it is possible to use the decode circuits 240 and 241 in common for data fetch to execute a 32-bit DSP instruction and data fetch to execute a 16-bit DSP instruction and thereby, decrease the logical scale of the microcomputer 1.

The invention made by the present inventor is concretely described above in accordance with embodiments. However, the present invention is not restricted to the embodiments. It is a matter of course that various modifications of the present invention are allowed as long as they follow the gist of the present invention.

For example, discrimination of a CPU instruction, 16-bit DSP instruction, and 32-bit DSP instruction is not restricted to the use of 6 high-order bits of an instruction but it is possible to change the number of high-order bits correspondingly to the number of instruction codes. Moreover, it is possible to replace the function for shifting 16 low-order bits to higher order for an instruction register with another function. Furthermore, the number of registers and the type of a computing unit included in a CPU core or DSP engine are not restricted to the above embodiments but it is possible to properly change them. Furthermore, it is possible to use more than two memories. Furthermore, it is possible to increase the number of address buses and the number of data buses to be connected to memories in accordance with the number of memories. For example, a Z memory is newly used in addition to X and Y memories. Then, an address bus ZAB is connected between a CPU and the Z memory and a data bus ZDB is connected between a DSP engine and the Z memory. By using the above structure, it is possible not only to capture data into the DSP engine from the X and Y memories at the time of multiply and accumulate operation but also to write the data whose arithmetic is completed before a currently execute instruction in a Z memory circuit through a Z bus at the same time. Thus, the whole throughput of a microcomputer is further improved because arithmetic data can be captured and written in a memory by one instruction. The present invention is the most suitable for use as a built-in unit control microcomputer to be applied to compression/expansion and filtering of information in a mobile communication unit, servo control, and image processing in a printer.

The following is the brief description of advantages obtained from a typical invention among those disclosed in this application.

That is, a built-in memory is divided into a first memory and a second memory by considering the multiply and accumulate operation by a digital signal processor and they are made accessible in parallel by a third bus and a second bus respectively. Therefore, a central processing unit can simultaneously transfer two data values to a digital signal processing unit from the built-in memory.

Moreover, because the third and second buses are separate from the first bus to be interfaced with an external unit, the central processing unit can access an external memory in parallel with the access to the second and first memories.

Thus, because there are first to third address buses and first to third data, buses respectively connected to the central processing unit, it is possible to execute different memory access operations in the same cycle by using these three types of internal buses. Therefore, it is possible to accelerate arithmetic processing easily a correspondingly to the case in which a program or data is present in an external memory.

Moreover, the built-in memory is divided into the first and second memories and each divided memory is provided with a ROM and a RAM. Therefore, by using the RAM as a data memory and the ROM as a program memory, the data memory and the program memory can be separated from each other. Thus, it is possible to transfer two data values to the digital signal processing unit in parallel and moreover, efficiently perform instruction fetch, data transfer, and arithmetic by parallel pipeline processing.

Therefore, it is possible to accelerate digital signal processing by mounting the central processing unit and the digital signal processing unit on an LSI.

By assigning in instruction code to an instruction in which a CPU instruction and a DSP instruction are mixed so that it can be discriminated that the instruction concerned is a CPU instruction, a 16-bit DSP instruction, or a 32-bit DSP instruction by decoding part of the instruction code, it is possible to decide the type of the instruction by a decoder with a small logical scale. Therefore, it is unnecessary to always decode 32 bits at the same time. Thus, it is possible to prevent the physical scale of an LSI from increasing to the utmost when mounting the central processing unit and the digital signal processing unit on the LSI.

By using a first-format instruction having a first code area (bit 9 to bit 0 of the 16-bit DSP instruction illustrated in FIG. 18) and a second-format instruction having not only a second code area (field A of the 32-bit DSP instruction illustrated in FIGS. 20 and 21 but also a third code area (field B of the 32-bit DSP instruction illustrated in FIGS. 20 and 21) for specifying the arithmetic processing using the transferred data specified by the second code area for the digital signal processing unit, means for executing the first- and second-format instructions respectively can use decode means having a decode logic common to the first and second code areas. Therefore, this also makes it possible to decrease the logical scale if a microcomputer.

What is claimed is:

1. A single-chip microprocessor comprising:
   a first processing unit;
   a second processing unit synchronously operating with the first processing unit and including a multiplier;
   first, second and third address buses coupled to the fist processing unit;
   first, second and third data buses coupled to the second processing unit, wherein the first and second data buses are coupled to the first processing unit;
   a first memory coupled to the first and second address buses and to the first and second data buses; and
   a second memory coupled to the first and third address buses and the fist and third data buses.

2. A single-chip microprocessor according to claim 1, wherein the first processing unit comprises:
   a plurality of general purpose registers;
   an arithmetic and logic unit;
   a program counter coupled to the first address bus and storing an instruction address;
   an instruction register coupled to the first data bus and storing an instruction supplied from the first data bus; and
   an instruction decoder decoding the instruction fetched in the instruction register and providing control signals in response to the decoding, wherein at least certain of the control signals control the arithmetic and logic unit.

3. A single-chip microprocessor according to claim 2, wherein the first processing unit fixer comprises an address output circuit providing address signals to the second and third address buses.

4. A single-chip microprocessor according to claim 3, wherein the address output circuit comprises:
   a first address buffer coupled to the second address bus;
   a second address buffer coupled to the third address bus; and
   an arithmetic operation unit operating on address information to be supplied to the first and second address buffers.

5. A single-chip microprocessor according to claim 2, wherein the second processing unit comprises a decoder circuit coupled to receive the control signals provided from the instruction decoder.

6. A single-chip microprocessor according to claim 5, wherein the second processing unit further comprises:
   first, second and third data buffer circuits coupled to the first, second and third data buses, respectively;
   an internal bus coupled to the multiplier and to the first, second and third data buffer circuits;
   a second arithmetic and logic unit coupled to the internal bus; and registers coupled to the internal bus.

7. A single-chip microprocessor according to claim 1, further comprising an external interface coupled to the first address bus and the first data bus.

8. A microprocessor on a semiconductor substrate comprising:

a first processing unit;

a second processing unit;

first and second address buses coupled to the first processing unit;

a first data bus coupled to the first processing unit and the second processing unit;

a second data bus coupled to the first processing unit and the second processing unit;

a first memory coupled to the first address bus and the first data bus; and a second memory coupled to the second address bus and the second data bus.

9. A microprocessor according to claim 8, wherein the first processing unit comprises an address providing circuit providing first and second address signals to the first and second address buses, respectively, to access the first and second memories in parallel, and wherein the second processing unit comprises first and second data buffer circuits to fetch first and second data provided from the first and second memories via the first and second data buses, respectively.

10. A microprocessor according to claim 8, wherein the first processing unit comprises:

an instruction register storing an instruction;

an instruction decoder decoding the instruction stored in the instruction register and providing control signals in response to the decoding; and an address providing circuit responsive to the control signals and providing first and second address to the first and second address buses, respectively, to access the first and second memories in parallel;

wherein the second processing unit comprises:

first and second data buffer circuits to fetch first and second data provided from the first and second memories via the first and second data buses, respectively; and a multiplier and an arithmetic logic unit operating on the first and second data provided from the first and second data buffer circuits.

11. A microprocessor according to claim 10, wherein the second processing unit further comprises a decoder responsive to the control signals from the instruction decoder and providing internal control signal for controlling the milkier and the arithmetic logic unit.

12. A single chip processor comprising:

first and second data buses transferring data;

first and second address buses transferring address signals;

a first memory coupled to the first address bus and first data bus, respectively;

a second memory coupled to the second address bus and second data bus, respectively;

a first processing unit responsive to an execution of one instruction and providing first and second address signals to the first and second address buses, respectively; and a second processing unit fetching in one bus cycle first and second data which are output from the first and the second memories responsive to the access by the first and second address signals.

13. A single chip processor according to claim 12, wherein the first processing unit includes general purpose registers which store the first and the second address signals.

14. A single chip processor according to claim 13, wherein the second processing unit comprises:

an internal bus;

a multiplier and an arithmetic logic unit coupled to the internal bus;

data registers;

a first data buffer circuit coupled between the internal bus and the fist data bus; and a second data buffer circuit coupled between the internal bus and the second data bus.

15. A single chip processor according to claim 12, wherein the first processing unit includes an instruction decoder providing control signals by decoding an instruction, and wherein the second processing unit includes a decoder circuit coupled to receive the control signals from the instruction decoder and providing internal control signals for controlling operations of an internal circuit in the second processing unit.

16. A single chip processor according to claim 15, wherein the second processing unit includes:

an internal bus;

a multiplier and an arithmetic logic unit coupled to the internal bus;

data registers coupled to the internal bus;

a first data buffer circuit coupled between the internal bus and the first data bus; and a second data buffer circuit coupled between the internal bus and the second data bus;

wherein operations of the multiplier, the arithmetic logic unit, the data registers, the first data buffer circuit and the second data buffer circuit are controlled by the internal control signals.

17. A single chip processor according to claim 12, wherein the first processing unit comprises:

a plurality of registers storing thee first and the second address signals;

an arithmetic and logic operation unit;

an instruction register storing the instruction;

an instruction decoder decoding the instruction stored in the instruction register and providing control signals in response to the decoding; and an address providing circuit responsive to the control signals and providing first and second address signals to the first and second address buses, respectively;

wherein operations of the plurality of registers, the arithmetic and logic unit and the address providing circuit are controlled by the control signals.

18. A single chip processor according to claim 17, wherein the second processing unit comprises:

a decoder circuit coupled to receive the control signals from the instruction decoder and providing internal control signals;

an internal bus;

a multiplier and a second arithmetic and logic unit coupled to the internal bus;

data registers coupled to the internal bus;

a first data buffer circuit coupled between the internal bus and the first data bus; and a second data buffer circuit coupled between the internal bus and the second data bus;

wherein the multiplier of the second processing unit, the second arithmetic and logic unit of the second processing unit, the data registers of the second processing unit, the first data buffer circuit of the second processing unit and the second data buffer circuit of the second processing unit correspond to the internal circuit and are controlled by the internal control signals.

19. In a single-chip microprocessor, a method comprising the steps of:
processing first-type instructions with a first processing unit;
processing DSP-type instructions with a second processing unit synchronously operating with the first processing unit, wherein the second processing unit processes at least some DSP-type instructions with a multiplier;
communicating address information over first, second and third address buses with the first processing unit;
committing data over first, second and third data buses to the second processing unit and communicating data over the first and second data buses to the first processing unit;
wherein a first memory is coupled to the first and second address buses and to the first and second data buses, and wherein a second memory is coupled to the first and third address buses and the first and third data buses; and
decoding an instruction received from the first memory and generating control signals in response to the decoding, wherein, in response to the control signals, the first processing processes the instruction if the instruction is a first-type instruction and the second processing unit processes the instruction if the instruction is a DSP-type instruction.

20. The method of claim 19, wherein the second processing unit processes DSP-type instructions of a first size and a second size, herein the first size is greater than the second size, the method further comprising a step of code converting the decoded instruction if the decoding determines that the instruction is a DSP-type instruction of the first size.

21. The method of claim 20, wherein the first processing unit processes first-type instructions of the second size.

22. The method of claim 21, wherein the first size is n bits and the second size is n/2 bits.

23. The method of claim 22, wherein n equals 32.

24. The method of claim 19, wherein the first processing unit accesses an external memory and the first memory or the second memory in parallel.

25. The method of claim 19, wherein tithe first processing unit provides first and second address signals to the second and third address buses, respectively, to access the first and second memories in parallel and Herein the second processing unit fetches first and second data provided from the first and second memories via the second and third data buses, respectively.

26. The method of claim 19, wherein the first processing unit provides first and second address signals to the second and third address buses, respectively, and the second processing unit fetches in one bus cycle first and second data from the first and the second memories responsive to the access by the first and second address signals.

27. In a single-chip microprocessor, a method comprising the steps of
processing first-type instructions with a first processing unit;
processing DSP-type instructions with a second processing unit synchronously operating with the first processing unit, wherein the second processing unit processes at least some DSP-type instructions with a multiplier;
communicating address information over first and second address buses with the first processing unit;
communicating data over first and second data buses to the second processing unit and to the first processing unit;
wherein a first memory is coupled to the first address bus and to the first data bus, and wherein a second memory is coupled to the second address bus and the second data bus; and
decoding an instruction received from the first memory and generating control signals in response to the decoding, wherein, in response to the control signals, the first processing processes the instruction if the instruction is a first-type instruction and the second processing unit processes the instruction if the instruction is a DSP-type instruction.

28. The method of claim 27, wherein the second processing unit processes DSP-type instructions of a first size and a second size, wherein the first size is greater than the second size, the method further comprising a step of code converting the decoded instruction if the decoding determines that the instruction is a DSP-type instruction of the first size.

29. The method of claim 28, wherein the first processing unit processes first-type instructions of the second size.

30. The method of claim 29, wherein the first size is n bits and the second size is n/2 bits.

31. The method of claim 30, wherein n equals 32.

32. The method of claim 27, wherein the first processing unit accesses an external memory and the first memory or the second memory in parallel.

33. The method of claim 27, wherein the first processing unit provides first and second address signals to the first and second address buses, respectively, to access the first and second memories in parallel, and wherein the second processing unit fetches first and second data provided from the first and second memories via the first and second data buses, respectively.

34. The method of claim 27, wherein the first processing unit provides first and second address signals to the first and second address buses, respectively, and the second processing unit fetches in one bus cycle first and second data from the first and the second memories responsive to the access by the first and second address signals.

* * * * *